Figure 4:
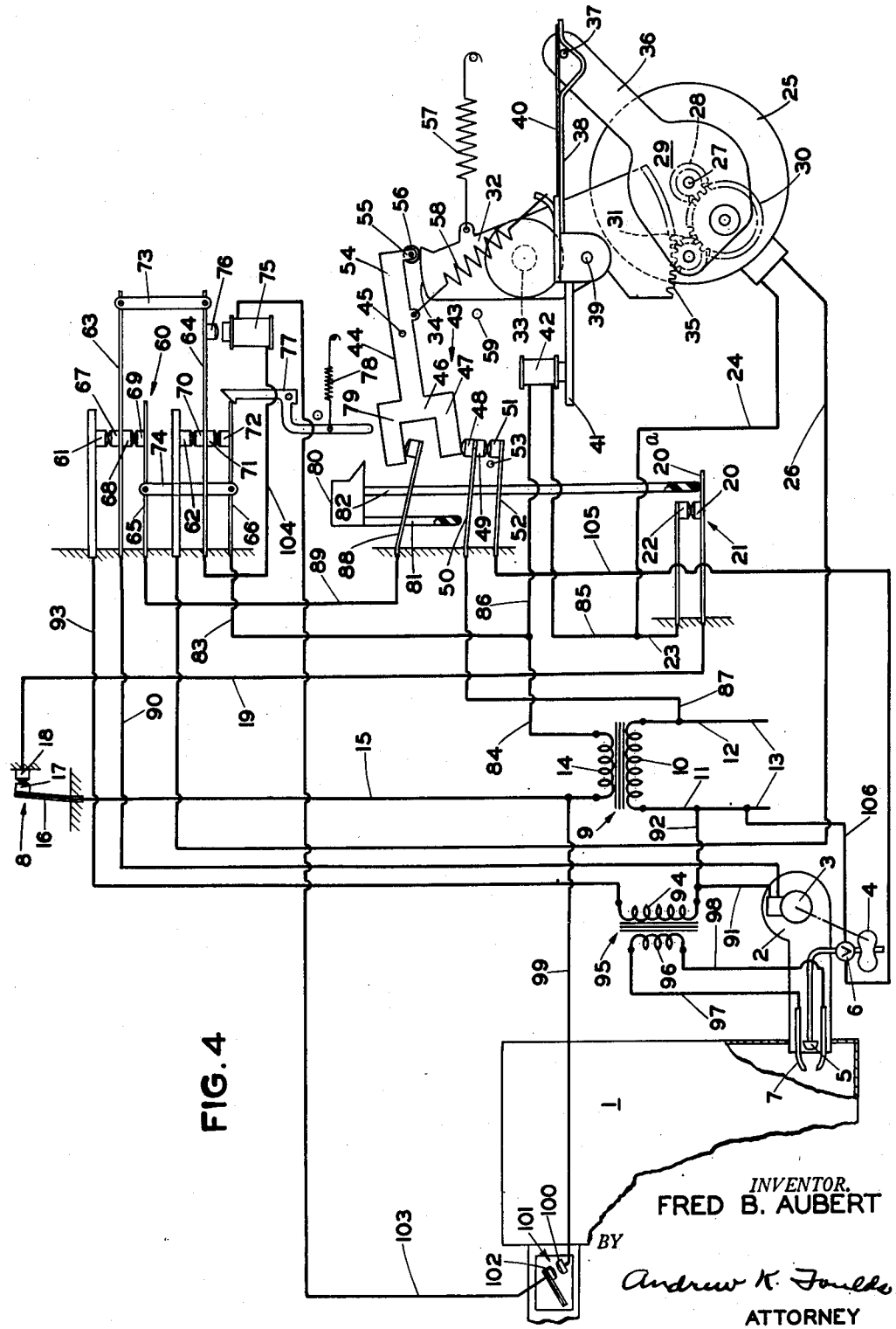

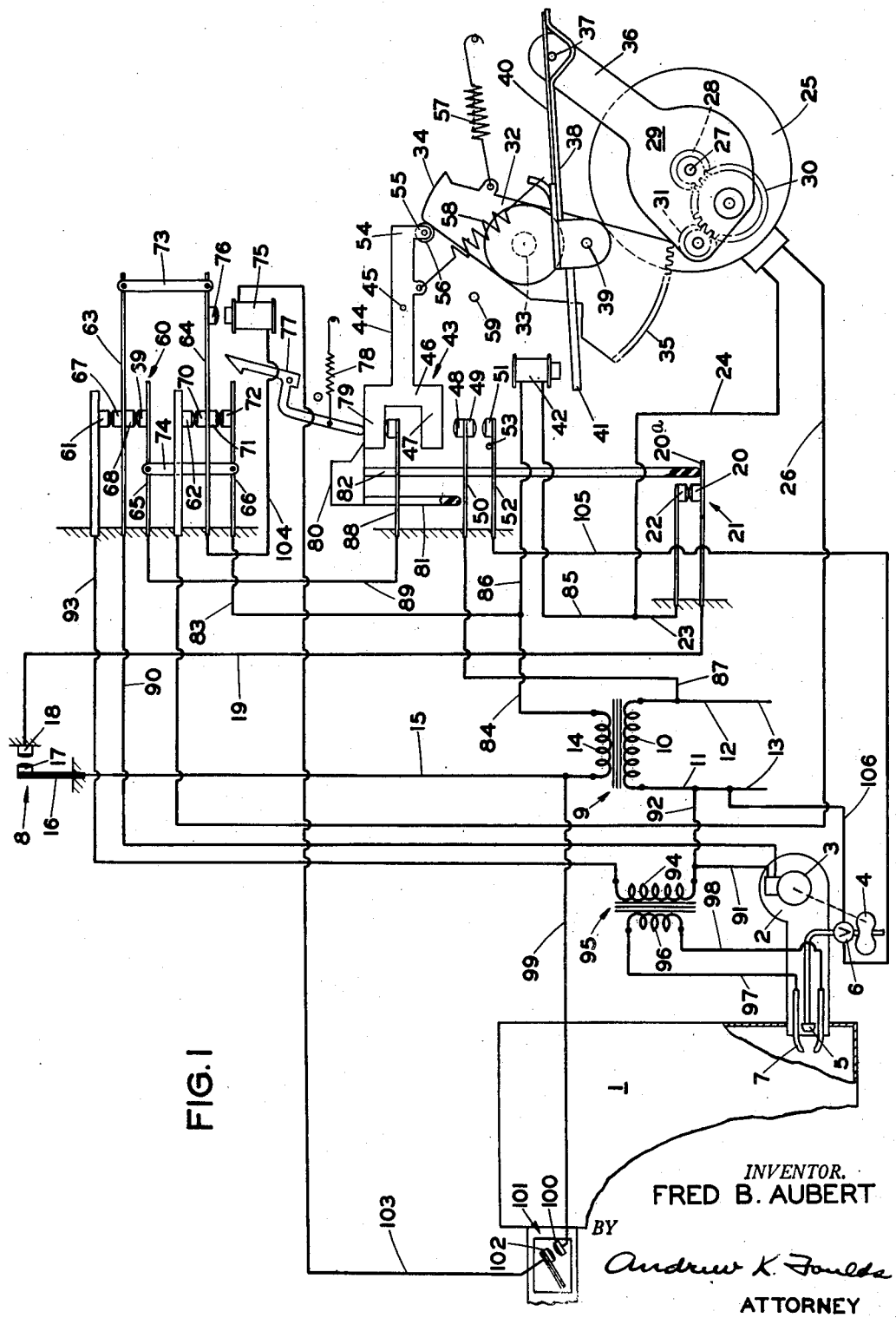

Nov. 18, 1952  F. B. AUBERT  2,618,323
ELECTRICAL CONTROL SYSTEM FOR BURNERS
AND CONTROL DEVICES THEREFOR
Filed April 2, 1949  10 Sheets-Sheet 2
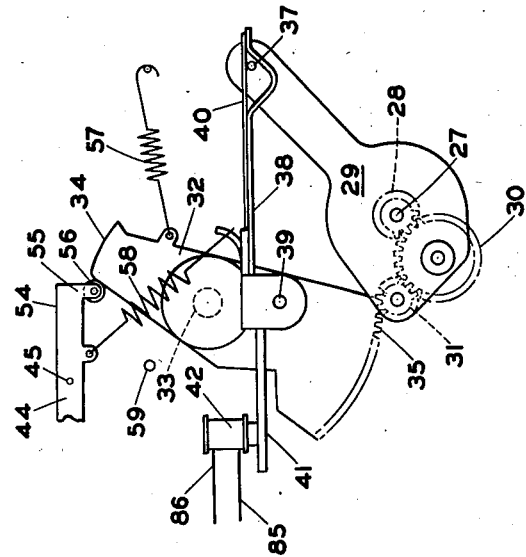
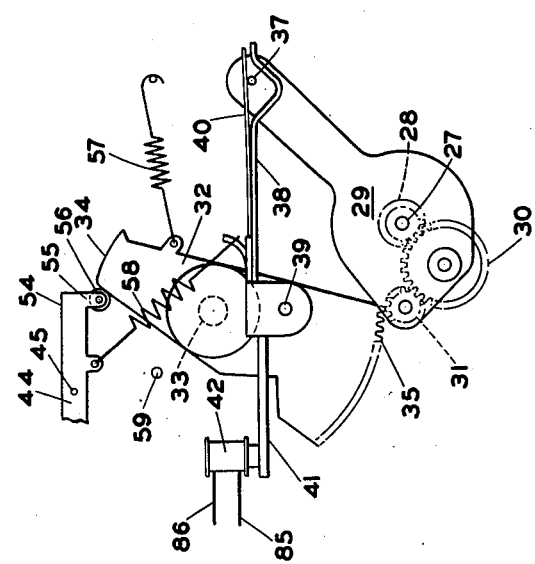
INVENTOR.
FRED B. AUBERT
BY
Andrew K. Foulds
ATTORNEY INVENTOR.
FRED B. AUBERT
BY Andrew K. Foulds
ATTORNEY Nov. 18, 1952 F. B. AUBERT 2,618,323
ELECTRICAL CONTROL SYSTEM FOR BURNERS
AND CONTROL DEVICES THEREFOR
Filed April 2, 1949 10 Sheets-Sheet 5
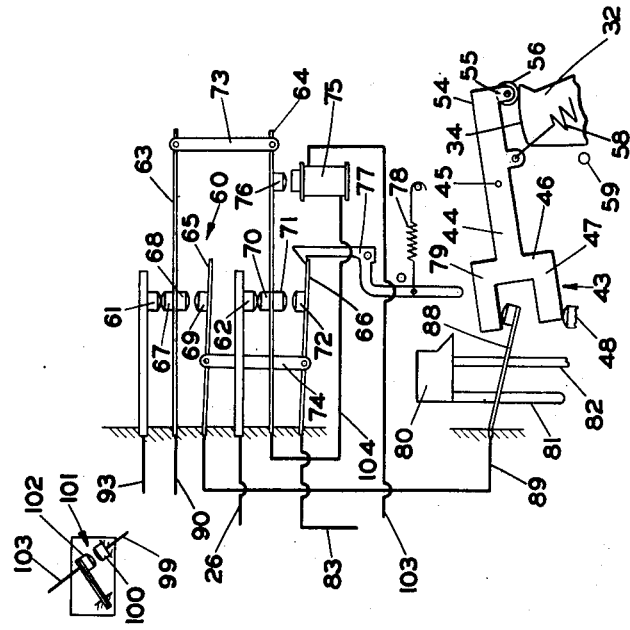
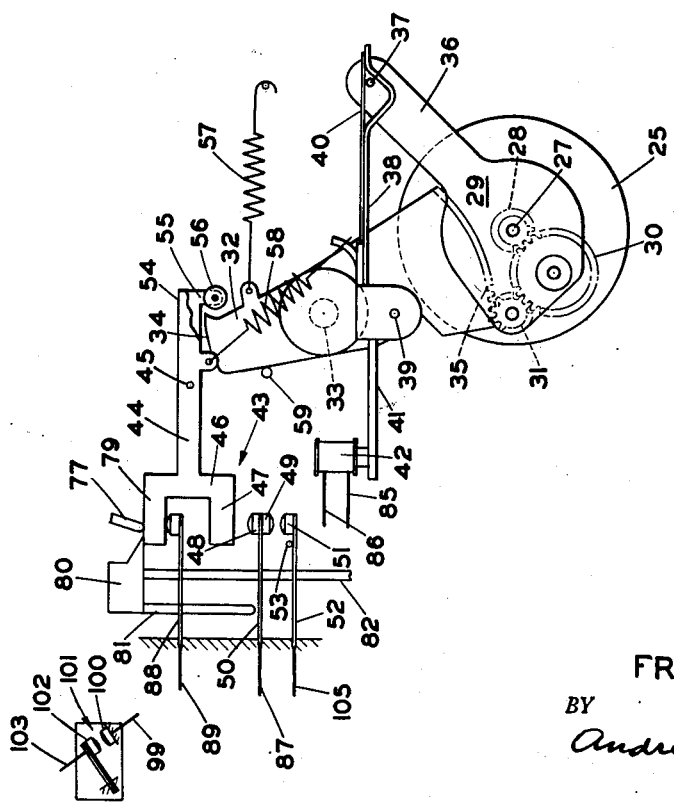
INVENTOR.
FRED B. AUBERT
BY
Andrew K. Foulds
ATTORNEY Nov. 18, 1952

F. B. AUBERT 2,618,323

ELECTRICAL CONTROL SYSTEM FOR BURNERS
AND CONTROL DEVICES THEREFOR

Filed April 2, 1949

10 Sheets-Sheet 6

*INVENTOR.*
FRED B. AUBERT
BY
Andrew K. Faulds
ATTORNEY

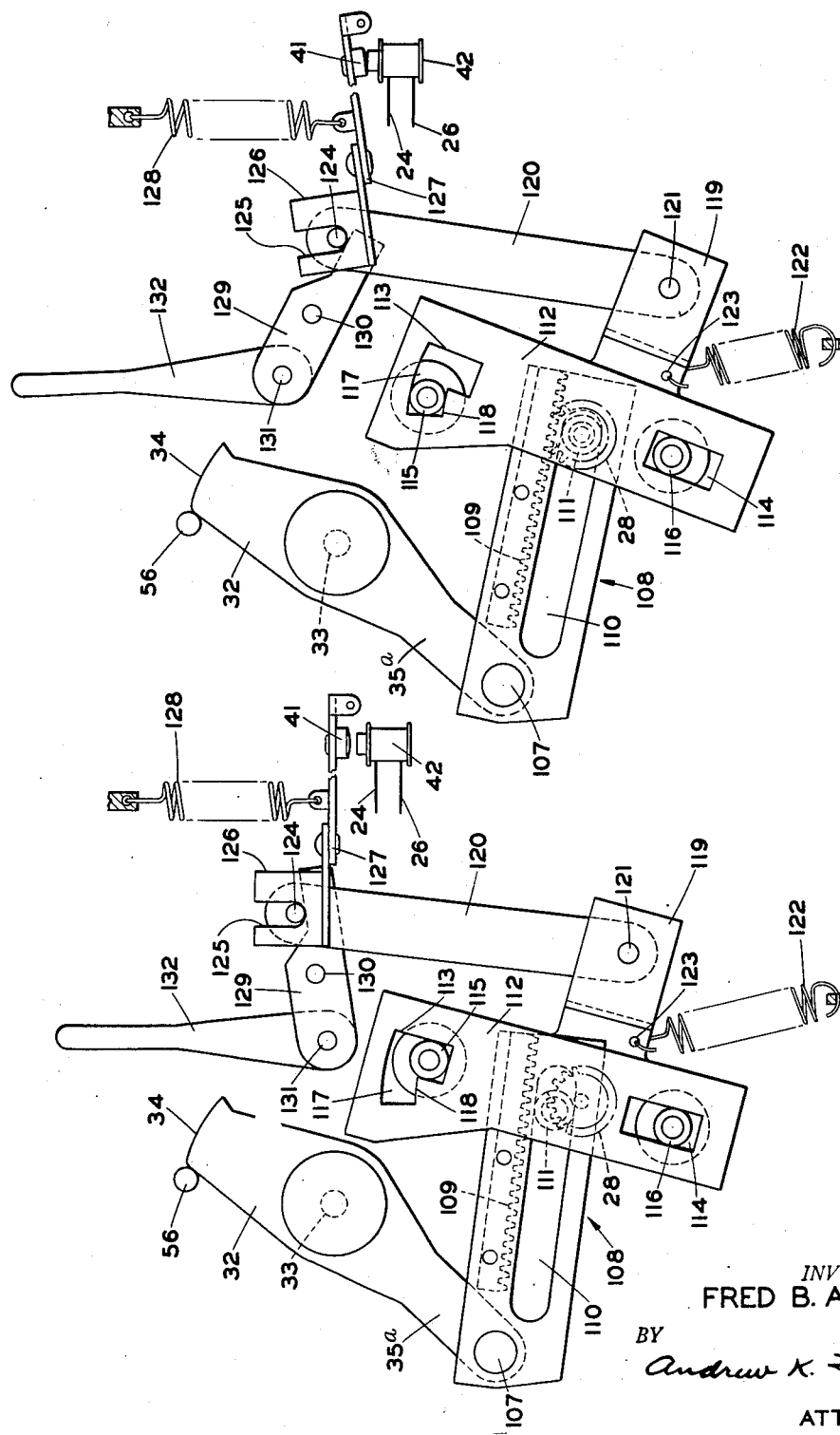

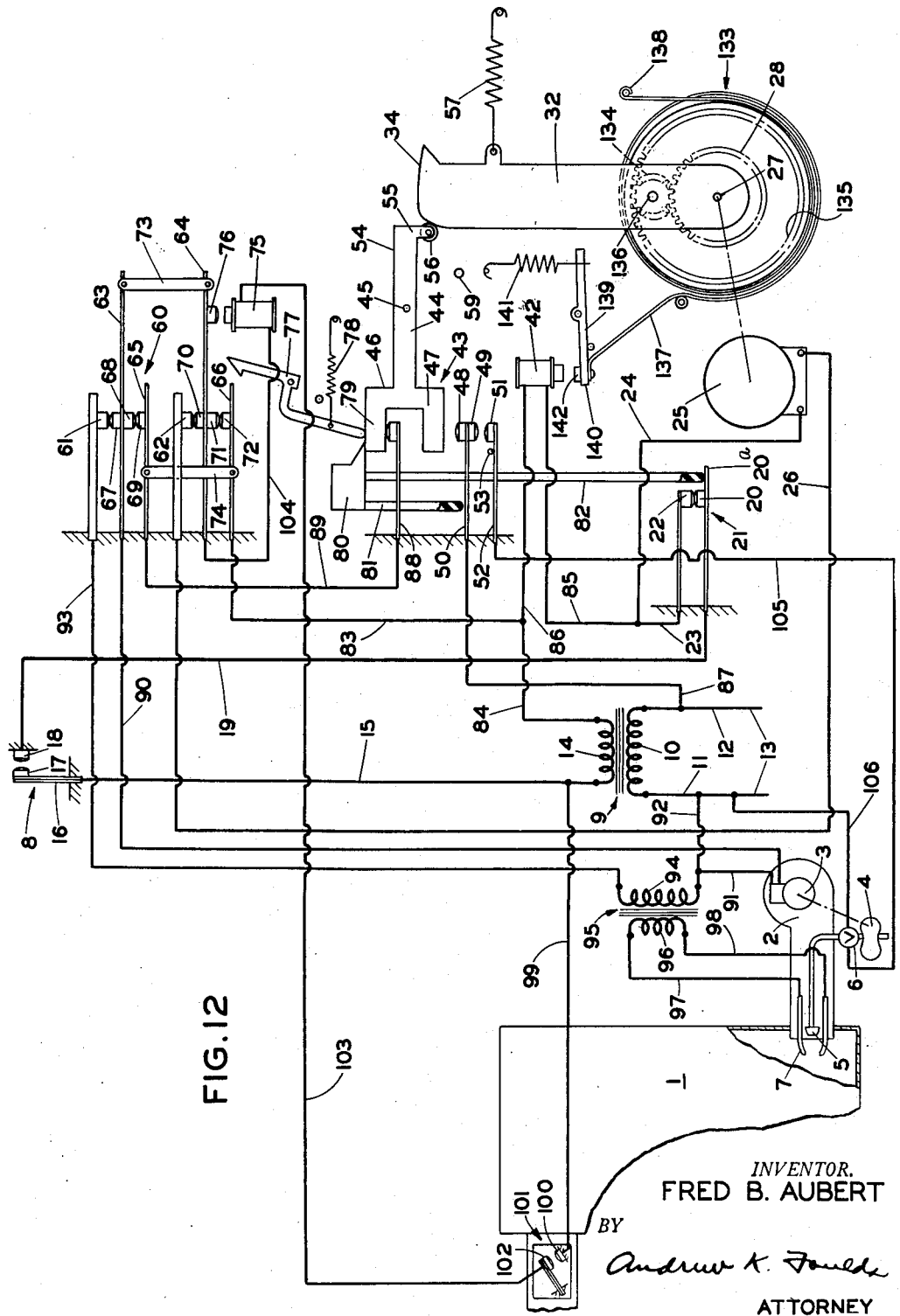

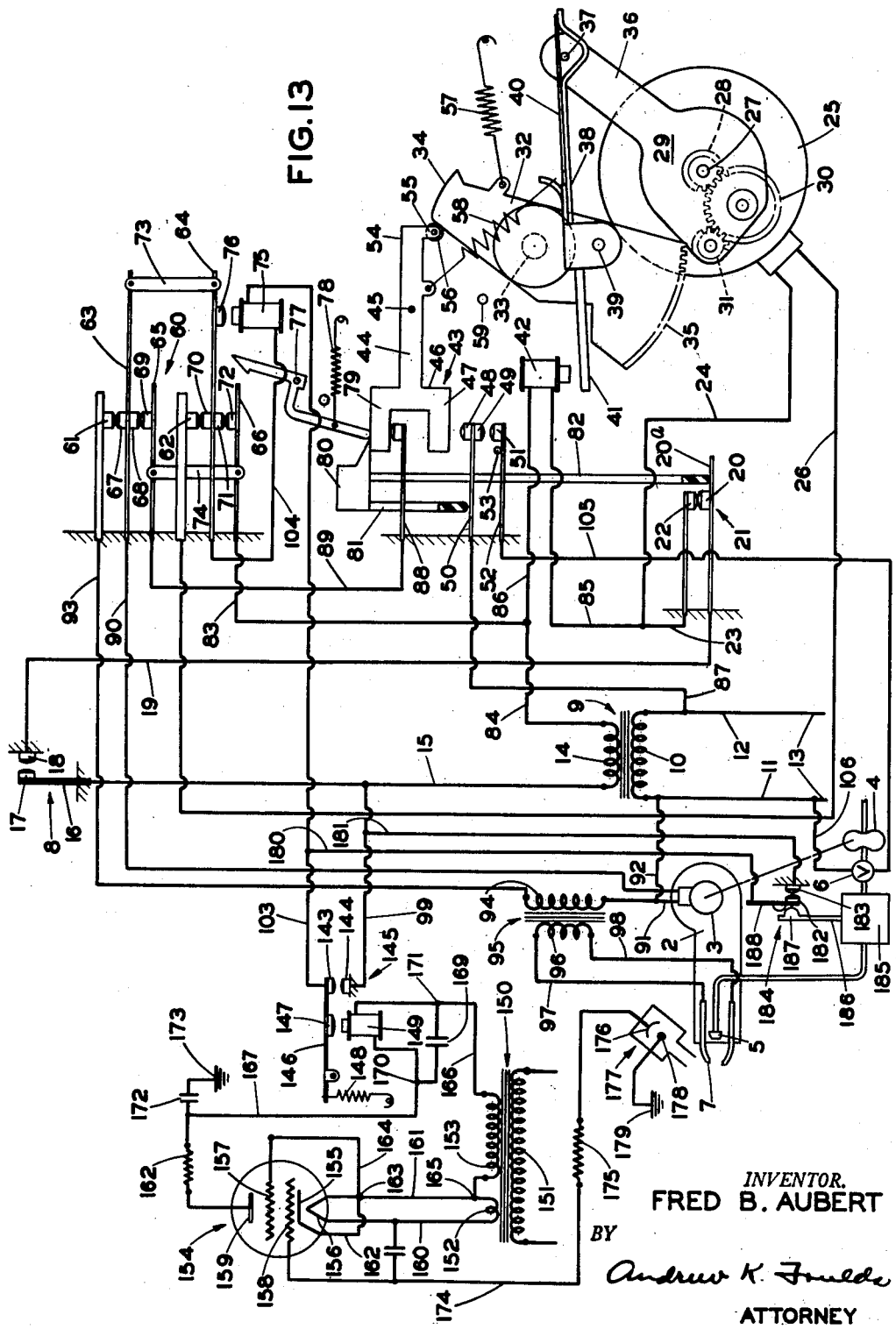

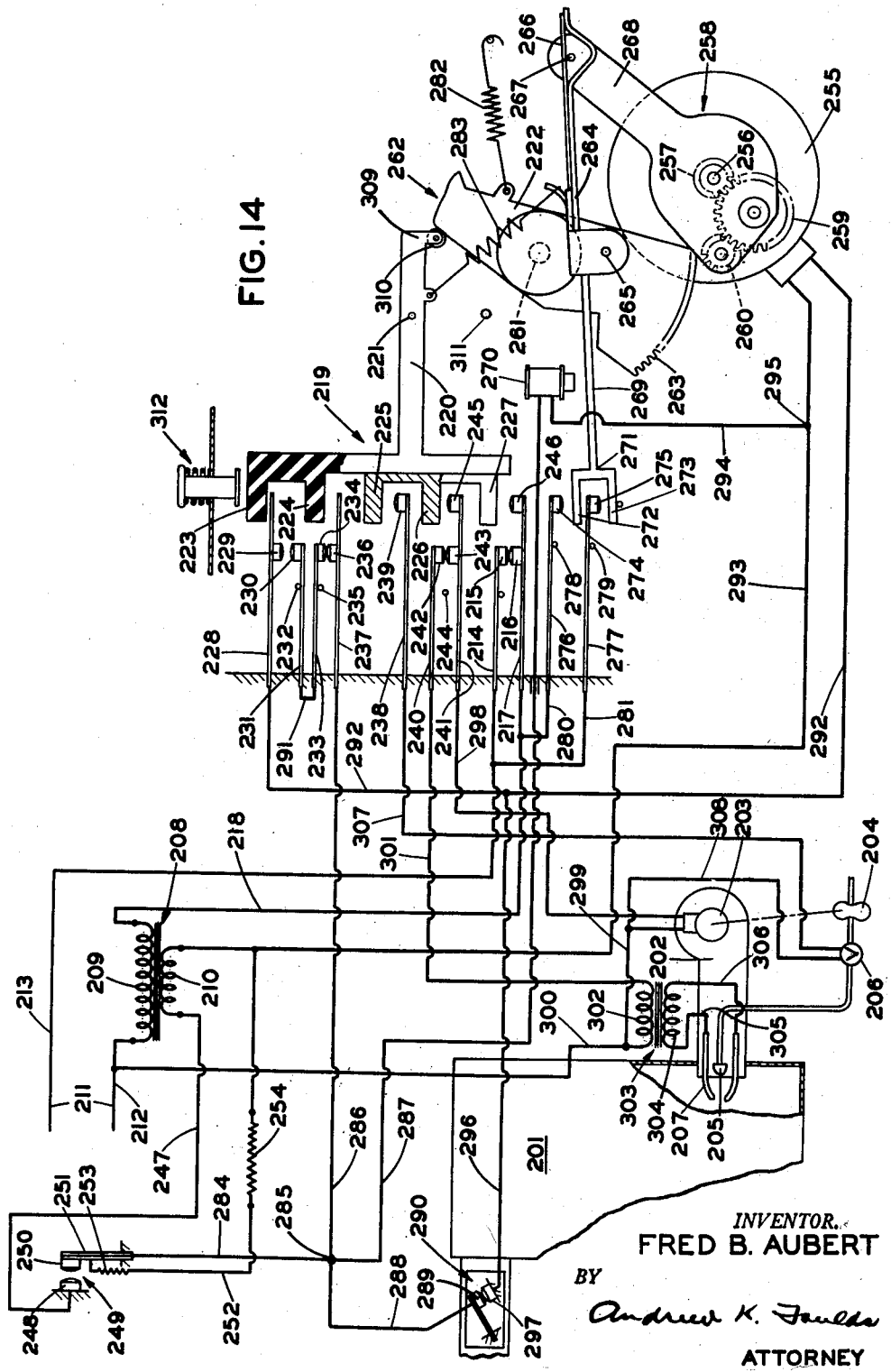

Patented Nov. 18, 1952

2,618,323

UNITED STATES PATENT OFFICE 2,618,323

ELECTRICAL CONTROL SYSTEM FOR BURNERS AND CONTROL DEVICES THEREFOR

Fred B. Aubert, Grosse Pointe, Mich.

Application April 2, 1949, Serial No. 85,064

42 Claims. (Cl. 158—28)

This invention relates to new and useful improvements in control systems for liquid fuel burners and to new and improved control devices therefor.

One of the objects of this invention is to provide a new and improved electrical control system for liquid fuel burners.

Another object is to provide a new and improved burner control system which controls the supply of fuel and ignition thereof in response to the occurrence or non-occurrence of flame in the burner by any flame responsive means capable of completing an electric circuit or blocking current flow through a circuit.

Another object is to provide a burner control system having electric timing means operable to initiate supply of fuel to the burner and to energize an electric ignition therefor and having a flame responsive means operable to deenergize the timing means and the ignition upon occurrence of flame, the timing means being operable to deenergize the system in the event that flame does not occur in the burner.

Another object is to provide a burner control system for a liquid fuel burner having a blower, ignition, and electrically operated fuel valve which is operable to energize the ignition and blower prior to the opening of the fuel valve and which is operable to deenergize the ignition and stop the supply of fuel to the burner in the event of non-occurrence of flame.

Another object is to provide a burner control system having a switch operating mechanism therein of new and improved construction.

Another object is to provide a burner control system having a novel relay switch operated safety mechanism controlled in response to flame in the burner.

Another object is to provide a novel switch operating mechanism including an electric timer motor and a pivoted switch operating member and having a novel gear engaging means for transmission of motion from the timer motor to the switch operating member.

Another object is to provide a burner control system for controlling the supply of fuel to a burner and the ignition thereof and including a means to shut off the supply of fuel in the event that flame does not occur in the burner substantially simultaneously with the emergence of fuel thereto.

Another object is to provide a burner control system having a novel timing means which will operate uniformly independently of varying ambient temperatures and fluctuating line voltages.

Another object is to provide a burner control system including an electric timing mechanism which will assume a safety shut off position upon failure of flame in the burner either from a starting or a running condition.

Another object is to provide a control device of new and improved construction for a burner control system.

Another object is to provide a control device for a burner control system which is operable to shut off the supply of fuel to the burner in the event of failure of flame therein.

Another object is to provide a control device for a burner control system which includes a novel safety switch mechanism.

Another object is to provide a control device for a burner control system which is operable to effect a supply of fuel to the burner and its ignition and which is operable to shut off the supply of fuel to the burner in the event that flame does not occur therein within a predetermined time.

Another object is to provide a burner control device having a novel timing means which will operate uniformly independently of varying ambient temperatures and fluctuating line voltages.

Other objects will become apparent from time to time throughout the specification and claims as hereinafter related.

The novelty of this control system and control device therefor will be fully and completely described and claimed in the specification and claims which follow.

In the accompanying drawings to be taken as part of this specification there are clearly and fully illustrated several embodiments of this burner control system, in which drawings:

Figure 1 is a diagrammatic view of one form of this burner control system.

Figure 5:
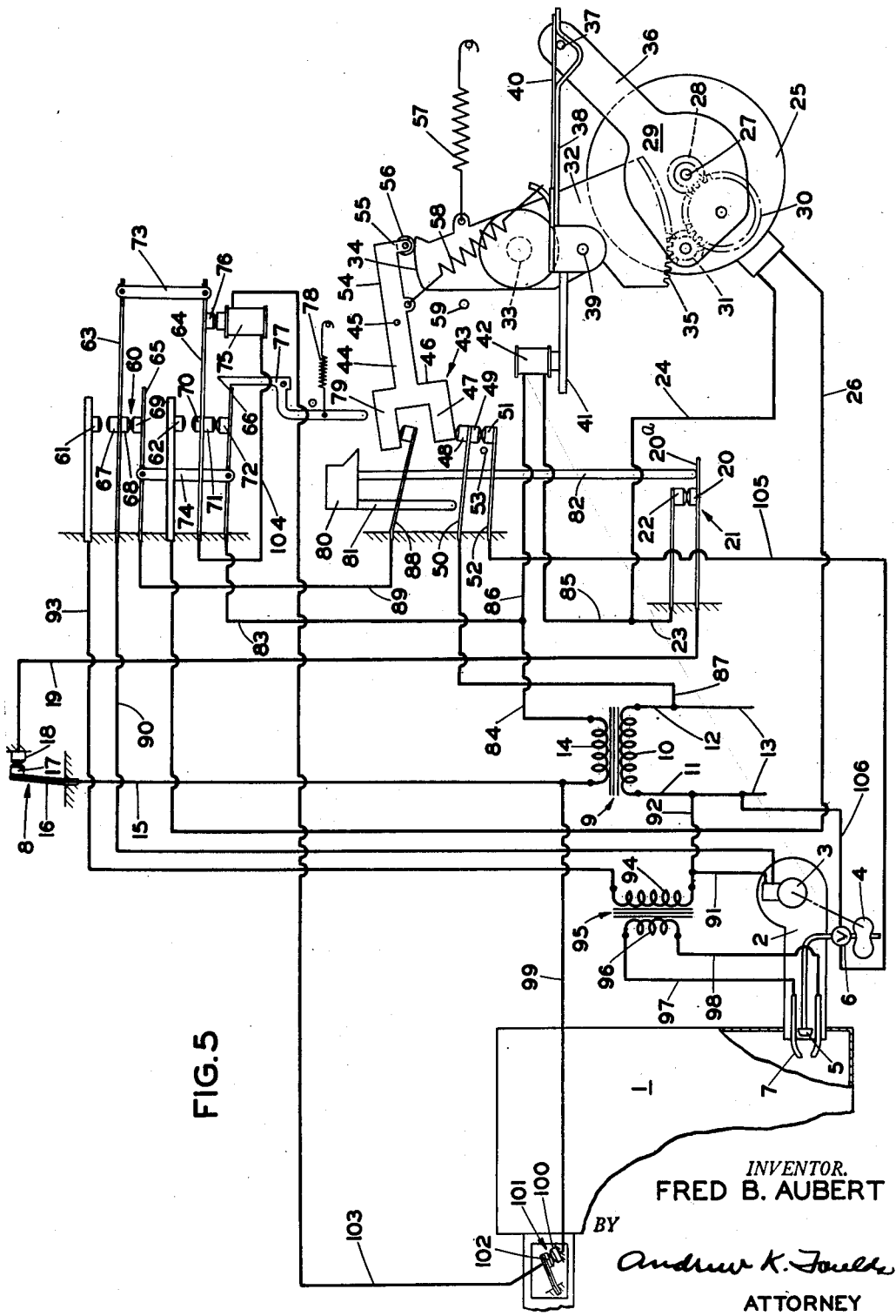

Fig. 2 is a view more or less diagrammatic of the gear engaging mechanism for the timing motor and switch structure associated therewith as shown in Fig. 1, Fig. 3 is a view similar to Fig. 2 and showing the gears for the timing motor and switch mechanism fully engaged, Fig. 4 is a view of the system as shown in Fig. 1 with the timing motor and switch mechanism partially operated and prior to the deenergization of the timer motor by the occurrence of flame in the burner, Fig. 5 is a view similar to Fig. 4 and shows the flame responsive switch closed and the switch structure controlled thereby open for deenergizing the timer motor, Fig. 6 is a partial view of the system of Fig. 1 and shows the timer motor and switch operating structure therefor in the position assumed in the event of flame failure on starting operation, Fig. 7 is a partial view of the system of Fig. 1 and shows the position of the relay safety switch mechanism in the event of flame failure from an operating position.

Figure 8:
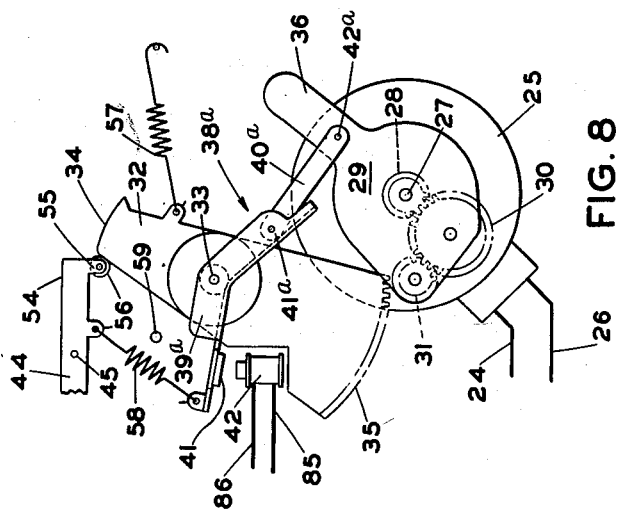
Figure 9:
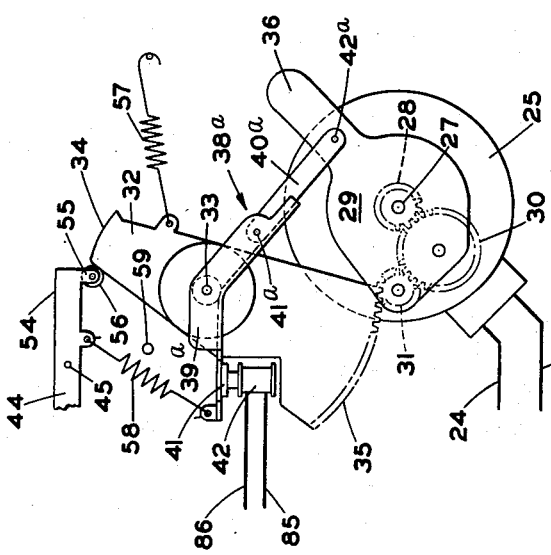

Fig. 8 is a view of the electric timing motor and switch operating structure associated therewith and having a different form of gear engaging mechanism, Fig. 9 is a view similar to Fig. 8 and shows the gear actuating mechanism and the gears in mesh, Fig. 10 is a view of the switch operating member of the system of Fig. 1 and having a rack and pinion arrangement for transfer of motion from the electric timing motor, Fig. 11 is a view similar to Fig. 10 but with the rack and pinion in engagement, Fig. 12 is a view of the system shown in Fig. 1 but having a planetary gear mechanism for transmitting movement from the electric timing motor to the switch operating member, Fig. 13 is a view of a modified system similar to that shown in Fig. 1 but including a photoelectric tube and circuit therefor for flame response and a flow responsive switch which cooperate to deenergize the system in the event that flame does not occur in the burner substantially simultaneously with the emergence of fuel thereinto, and Fig. 14 is a diagrammatic view of another modification of this control system.

Referring to the drawings by characters of reference there is shown in Fig. 1 a burner control system having a liquid fuel burner generally designated as 1. There is an electrically operated blower 2 driven by a motor 3 which also operates a fuel pump 4 for supplying fuel to the burner nozzle 5. There is an electrically operated valve 6 which controls the supply of fuel to the burner and an electric ignition means 7 is provided for ignition of fuel. A room thermostat generally designated as 8 controls the energization of the system in accordance with the heat requirements of the space being heated by the burner 1. There is a transformer 9 which supplies electric power for energizing this system and which has the primary 10 connected by lead wires 11 and 12 to a power source 13. The secondary 14 of the transformer 9 is connected by a conductor 15 to the blade 16 and movable contact 17 of the thermostat 8. The fixed contact 18 of the thermostat 8 is connected by a conductor 19 to one contact 20 of a reset switch 21. The other contact 22 of the switch 21 is connected by conductors 23 and 24 to an electric timing motor 25. The timing motor 25 is connected by a conductor 26 to another switch which will be described hereinafter and thence back to the other side of the transformer secondary 14. The motor 25 has a motor shaft 27 with a pinion gear 28 thereon. There is a pivoted member 29 which is pivoted on the motor shaft 27 and which has secured thereon two gears 30 and 31 which are operable to transmit movement from the motor 25 and which are pivotally movable by the pivoted member 29. There is a switch operating member 32 which is pivoted as at 33 and which has a switch operating cam face 34 at its upper end and a sector gear portion 35 at its lower end. The pivoted member 29 is operable upon movement to move the gear 31 into or out of engagement with the sector gear 35 for transmission of motion from the motor 25 to the switch operating member 32. The pivoted member 29 has an extension 36 thereon and a pin 37 protruding therefrom which is engageable with an operating lever 38 for actuation. The lever 38 is pivoted as at 39 and has a leaf spring portion 40 which engages the pin 37 on the gear operating member 29 for resilient operation thereof as will be subsequently described.

The lever 38 has a magnetic armature portion 41 which is cooperable with an electromagnet 42 for moving the gears into engagement. There is a switch structure generally designated as 43 which is operated by the switch operating member 32 and which includes an operating lever 44 pivoted as at 45. The end portion 46 of the switch operating lever 44 is of an electrical conducting material and has an arm 47 which functions as an electric contact. There are a pair of electrical contacts 48 and 49 which are carried by a flexible arm 50. There is another electrical contact 51 which is carried by a flexible arm 52 and limited in its movement by a stop member 53. The switch operating lever 44 upon pivotal movement is first operable to make contact between the contact portion 47 and the contact 48 and upon subsequent movement to flex the contact arm 50 to make contact between the contacts 49 and 51. The end portion 54 of the switch operating lever 44 has a downturned portion 55 with a bearing roller 56 carried thereon for engagement with the switch operating cam face 34. The pivoted switch operating member 32 is held by a spring 57 in an initial position out of operating engagement with the bearing roller 56. A spring 58 holds the lever 44 in an initial position with the contacts as shown in Fig. 1. There is a stop member 59 which limits movement of the pivoted switch operating member 32. There is another switch structure generally designated as 60 which is in the nature of a double pole double throw switch. The switch 60 has two fixed contacts 61 and 62 and has a first pair of movable contact arms 63 and 64 and a second pair of movable contact arms 65 and 66. The contact arm 63 carries two oppositely facing contacts 67 and 68. The contact arm 63 is positioned for initial engagement of the contact 67 with contact 61 and the contact arm 65 carries thereon a contact 69 which is initially engaged with contact 68. The contact arm 64 carries oppositely facing contacts 70 and 71 and the arm 66 carries a contact 72. The contact arms 64 and 66 are positioned so that contacts 62 and 70 and contacts 71 and 72 are initially engaged. Contact arms 63 and 64 are arranged for movement together as by a connecting linkage 73 and contact arms 65 and 66 are similarly connected by a linkage 74. There is an electromagnet or relay coil 75 which is cooperable with an armature portion 76 on the contact arm 64 for actuating the switch structure 60. There is a latch member 77 which is urged by a spring 78 toward latching engagement with the contact arm 66 and which is held out of engagement therewith by the upper prong or arm 79 of the switch operating lever 44. There is a reset member 80 which is engageable with the arm 79 of the switch lever 44 and which has arms 81 and 82 which are engageable with the switch blades 50 and 20a respectively. The conductor 26 from the timer motor 25 is connected to the fixed contact 62 of the switch mechanism 60, the circuit being completed therefrom back to the transformer secondary 14 by the conductor 83 from the switch contact arm 66 and by conductor 84 which is connected to the transformer secondary 14. Conductors 85 and 86 connect the electromagnet 42 to conductors 23 and 84 respectively to establish a circuit for the electromagnet 42 in parallel with the motor 25. From the conductor 12 on the high voltage or primary side of the transformer 9 a conductor 87 leads to the blade or contact arm 50 of the switch 43. The upper arm 79 of the switch 43 is connected by a flexible blade or conductor 88 and by a conductor 89 to the contact arm 65 of the switch mechanism 60. From the contact arm 63 of the switch mechanism 60 a conductor 90 leads to the motor 3 of the blower 2, this motor being connected by conductors 91 and 92 to the other high voltage conductor 11 on the primary side of the transformer. The fixed contact 61 of the switch mechanism 60 is connected by conductor 93 to one side of the primary 94 of the ignition transformer 95, the other side of which is connected to conductor 92 leading back to the transformer primary. The ignition transformer 95 has a secondary 96 which is connected by conductors 97 and 98 to the ignition means or electrodes 7. From the secondary 14 of the transformer 9 the conductor 99 leads to the fixed contact 100 of a thermostatic stack switch 101. The movable contact 102 of the stack switch 101 is connected by a conductor 103 to one side of the relay coil 75. The other side of the relay coil is connected by a conductor 104 to the movable contact arm 64 of the switch mechanism 60, the relay coil circuit being completed by conductors 83 and 84 back to the transformer secondary 14. The flexible switch arm 52 of the switch 43 is connected by a conductor 105 to the fuel valve 6 which is in turn connected to high voltage conductor 11 of the transformer 9 by a return conductor 106. This last-mentioned circuit through the fuel valve 6 is in parallel with the circuits to the blower motor 3 and the ignition transformer 95.

In operation this system functions generally as follows: Upon a demand for heat by the space which is heated by the burner 1 the contacts 17 and 18 of the room thermostat 8 are closed by a warping of the thermostat blade 16. The closing of the room thermostat contacts establishes circuits to the timer motor 25 and the relay coil 42. From the transformer secondary 14 the circuit to the timer motor 25 extends by way of conductor 15, thermostatic contacts 17 and 18, conductor 19, contacts 20 and 22 of the switch 21 and conductor 24 to one side of the motor 25. From the other side of the motor 25 conductor 26 leads to the fixed contact 62 of the switch structure 60 and the circuit is completed through the closed contacts 62, 70, 71 and 72 and the switch contact arm 66 to the conductors 83 and 84 which connect back to the transformer secondary 14. The circuit for electromagnet 42 is connected in parallel with the timer motor circuit from the reset switch 20 by conductors 85, 86 and 84. From the foregoing it is seen that when the room thermostat 8 is closed the timer motor 25 is energized and the electromagnet 42 is likewise energized. Upon energization of the electromagnet 42 the armature portion 41 of the gear engaging lever 38 is pulled toward engagement with the electromagnet 42 and the pivoted arm 29 is pivoted to move the gears 30 and 31 for engagement with the sector gear portion 35 of the pivoted switch operating member 32. The force of the movement of the gear engaging lever 38 is transmitted by the leaf spring 40 thereon to the pin portion 37 on the pivoted member 29 and if the gear teeth of the gears 31 and 35 should abut rather than mesh, as is shown in Fig. 2, the leaf spring 40 is flexed away from the lever 38 and is operable to continue the movement of the pivoted gear engaging member 29 upon motion of the gear teeth from an abutting position so that they may assume a meshed position as shown in Fig. 3. Upon meshing engagement of the gear 31 and the sector gear 35 the movement of the timer motor 25 is transmitted to the switch operating member 32 which begins to pivot to move the cam face 34 under the bearing roller 56 of the switch lever 44 for operation of the switch lever 44 and the switch structure 43. As the cam face 34 of the pivoted member 32 begins to move under the bearing roller 56 the switch lever 44 moves and first makes contact between the contact arm portion 47 and the contact 48. This contact between the contacts 47 and 48 establishes high voltage circuits to the blower motor 3 and the ignition transformer 95. Upon continued movement of the cam face 34 under the bearing roller 56 the switch lever 44 is moved further and the contact arm 50 is flexed downward thereby until contact is made between the switch contacts 49 and 51 which completes a circuit for energization of the fuel valve 6. By this arrangement, the sequential engagement of the switch contacts 47 and 48 and 49 and 51, there is provided a simple means for energizing the blower and the burner ignition a short predetermined time prior to the opening of the fuel valve. The advantages of energizing the burner ignition and blower a short time prior to the supplying of fuel to the burner are well known in the art, the principal advantages being the protection against extinguishment of the ignition arc when the line current has dropped as a result of a circuit overload and also the preventing of carbonization on the burner nozzle. This sequential operation of the blower and ignition and fuel valve has been accomplished in the past by use of a "current surge" relay switch but by the present construction the requirement of such an additional relay switch is eliminated by the use of an extra switch (contacts 49 and 51) operated by the main timer motor. The system with the timer motor energized, gears engaged, and operating member moved to close the blower and ignition, and fuel valve switches is shown in Fig. 4. At this point in the operation the high voltage ignition and blower motor circuits are completed as follows: From the high voltage wire 12 the conductor 87 leads to the contact arm 50 of the switch structure 43. From this point the circuit runs through the closed contacts 47 and 48, the flexible arm 88, and the conductor 89 to the switch contact arm 65 of the switch structure 60. At this point the blower motor and ignition circuits divide, the blower motor circuit running through the switch contacts 68 and 69 and the contact arm 63 and the ignition circuit running through all of the closed contacts 69, 68, 67, and 61. The blower motor circuit is completed by the conductor 90 which connects the switch contact arm 63 to one side of the motor 3 and the conductors 91 and 92 which lead from the other side of the motor to the high voltage wire 11. The ignition circuit is completed from the switch structure 60 by the conductor 93 which connects the fixed contact 61 to one side of the ignition transformer primary 94, the conductor 92 connecting the other side of the primary 94 to the high voltage wire 11. At this point in the operation, the blower 2 is energized and supplying air to the burner, the ignition 7 is energized for igniting fuel, and the fuel valve 6 is open permitting the fuel pump 4 to supply fuel to the burner. If the fuel is ignited in the burner in the position thus far described and shown in Fig. 4, the thermostatic stack switch 101 will respond to the occurrence of flame and its switch contacts 100 and 102 will be closed thereby. Upon closing of the stack switch contacts a low voltage circuit is completed from the transformer secondary 14 by way of the conductor 99, the switch contacts 100 and 102, and the conductor 103 to one side of the relay coil 75. The other side of the relay coil 75 is connected by the conductor 104 to the contact arm 64 and the circuit extends through the closed switch contacts 71 and 72 and the conductors 83 and 84 back to the transformer secondary 14. As is seen by reference to Fig. 4, when the switch lever 44 is moved to close the blower and ignition and fuel valve switches the upper arm portion 79 thereof is moved out of engagement with the latch member 77 and this latch member thereupon moved into a partial engagement with the lower switch contact arm 66. When the stack switch 101 is energized by occurrence of flame and the circuit completed for the relay coil 75, as was previously described, the relay coil 75 is operable to attract the armature portion 76 and pull down the contact arms 63 and 64. Upon downward movement of the contact arms 63 and 64 the contacts 67 and 70 are moved away from the fixed contacts 61 and 62 respectively but the contacts 68 and 71 remain closed against their respective contacts 69 and 72 as the contact arms 65 and 66 are operable to be flexed or moved upon movement of the arms 63 and 64. Upon opening of the contacts 61 and 67 the circuit to the ignition transformer 95 is broken and the ignition deenergized thereby. Upon opening of the contacts 62 and 70 the circuit for the timer motor 25 is deenergized and the motor is then stopped in the position indicated in Fig. 5. When the relay coil 75 is energized and the contact arms pulled down as indicated the lower contact arm 66 is operable to move into a latching engagement with the latch member 77 as is indicated in Fig. 5 so that upon deenergization of the relay coil the return movement of the contact arms 65 and 66 will be restrained and the contact arms 63 and 64 will return to their original position thus opening the contacts 68 and 71 from the contacts 69 and 72 respectively.

From the foregoing description it is seen that there is herein provided a system for the control of a liquid fuel burner which is operable to energize the blower and ignition in advance of the supply of fuel to the burner and which is operable upon occurrence of flame in the burner to deenergize the ignition circuit and the circuit to the timing motor. Since the circuit for the gear engaging electromagnet 42 is in parallel with the motor circuit and since it does not extend through any of the switch contacts which are controlled by the relay coil 75 it is seen that the gears are engaged upon energization of the electromagnet circuit by the closing of the room thermostat contacts and not affected by the operation of the relay switch structure 60 upon occurrence of flame. If, at the start of the burner heating cycle, the flame does not come on in the burner within the predetermined time required for the operating member 32 to be moved by the timer motor 25 across the full length of the cam face 34, the relay coil 75 will not be energized and the timer motor 25 will continue to move the switch operating member. Upon continued movement of the switch operating member 32 by the timer motor 25 beyond the predetermined time required to move the cam face 34 under the bearing roller 56 the cam face 34 will move completely out from under the bearing roller 56 and the switch lever 44 will then pivot in the opposite direction to open the switch contacts 47, 48, 49 and 51 and will assume the position indicated in Fig. 6. The timer motor will by this time have moved the switch operating member 32 against the stop or limit 59 and will then stall. In normal operation of the system when the circuit through the room thermostat 8 is opened the gear engaging electromagnet 42 is deenergized and the gears 31 and 35 disengaged to permit the spring 57 to move the switch operating member 32 back to its initial position. However, when the operating member 32 has moved to the "safety" position indicated in Fig. 6 upon non-occurrence of flame, the bearing roller 56 and downturned portion 55 of the switch lever 44 will engage the side of the operating member 32 as a latch to prevent it from returning to its initial position. When the burner system has operated through to the safety position as in Fig. 6 as a result of non-occurrence of flame in the burner the reset member 80 must be operated to permit the system to be restarted. When the reset member 80 is pushed down against the end portion 79 of the lever 44, the bearing roller 56 and downturned portion 55 are manually moved out of latching engagement with the edge of the switch operating member 32 to permit said operating member to return to its original position as indicated in Fig. 1. The finger 81 on the reset member 80 is operable to engage the switch arm or blade 50 to move the contact 48 away from the lever contact surface 47 so that the system can not operate in the event that the reset member 80 is jammed down. The other finger 82 on the reset member 80 is operable to open the reset switch 21 simultaneously with the moving of the switch lever 44 out of latching engagement with the operating member 32. The opening of the reset switch 21 by the reset member 80 is operable to open the circuit to the gear engaging electromagnet 42 to disengage the gears to permit the operating member 32 to assume its original position as soon as the lever portions 55 and 56 are moved out of latching engagement therewith. If, during the operation of the system, when the system has assumed the position indicated in Fig. 5 with the blower and fuel valve energized and the ignition deenergized and the relay switch 60 in an actuated position, there should be a loss of flame in the burner so that the stack switch contacts 100 and 102 are opened the relay coil 75 would be deenergized and the contact arms 63 and 64 moved upward to their initial position. However, since the contact arms 65 and 66 are latched in a down position the movement of the arms 63 and 64 upward would break the contacts 68 and 71 away from the contacts 69 and 72 respectively. The opening of the contacts 68 and 69 would break the circuit to both the ignition and the blower. The opening of the contacts 71 and 72 would open the circuit to the relay coil 75 and maintain open the aforementioned circuit to the timer motor 25. This position is indicated in Fig. 7 and at this point in the operation the timer motor 25 and the relay coil 75 cannot again be operated until the latch member 77 is released. From this position the system can be restarted by opening the room thermostat circuit to deenergize the gear engaging electromagnet and permit the switch operating member 32 to move back to its original position. When the switch operating member 32 is moved back to its original position the switch lever 44 is pivoted in a switch opening direction and the upper arm 79 thereof is operable to engage the latch member 77 and pivot the same out of latching engagement with the contact arm 66 to permit the arms 65 and 66 to return to their original position as shown in Fig. 1.

From the foregoing description it is seen that there is provided a novel system whereby the ignition and burner and fuel supply are turned on initially and if there be flame within a predetermined time the ignition is deenergized and the timing motor stopped, but if flame does not occur within the said predetermined time the timing means is operable to move the ignition and blower and fuel valve switches to a safety position deenergizing all of the circuits thereof and requiring a manual reset. There is also provided a means for locking out the system in a safety position upon failure of flame from a running or operating position. In prior burner control systems of this general type one of the principal disadvantages has been that unfavorable conditions may result from a chattering or momentary making and breaking of the contacts of the various switches in the system. By the arrangement used in this system if there is a chattering of contacts any place in the system or any place in the circuits associated therewith, including the power source, the system will either go back to its initial starting position or will assume one of the safety positions indicated according to which contacts are so chattering. In commercial construction the entire system shown with the exception of the room thermostat, the stack switch, the ignition transformer, the blower motor, and the fuel valve would probably be enclosed in a casing as a unitary control device.

Referring to Figs. 8 and 9 there is shown a slight modification of the gear engaging mechanism for the timing motor of the system shown in Fig. 1. All parts which are common to Fig. 1 are given the same reference characters. In the gear engaging mechanism of Fig. 8 the lever 38 of Fig. 1 has substituted therefor a linkage mechanism 38a. The linkage mechanism 38a comprises two links 39a and 40a which are pivoted to each other as at 41a. The link 39a is pivoted on the pivot 33 of the operating member 32 and the link 40a is pivoted to the projecting portion 36 of the gear engaging member 29 as at 42a. The link 39a has an armature portion 41 as does the lever member 38 in Fig. 1 and is connected to the lever member 44 by a spring 58. The linkage 38a as shown in Fig. 8 is in a bent position and has moved the gears to a disengaged position. Upon energization of the electromagnet 42 the armature portion 41 is attracted thereto and the links 39a and 40a are straightened to assume the position shown in Fig. 9. Upon straightening of the links 39a and 40a the linkage 38a is operable to pivot the member 29 to engage the gears 31 and 35 for operation. When the linkage 38a is straightened and the gears are engaged as shown in Fig. 9 the straightened linkage is operable to receive and restrain the reactive thrust of the gear 31 against the sector gear 35.

Referring to Figs. 10 and 11 there is shown another form of gear engaging mechanism wherein a rack and pinion arrangement is used. The system is otherwise as shown in Fig. 1.

In Fig. 10 the lower end portion 35a of the switch operating member 32 is pivotally connected as at 107 to a rack member generally designated as 108. The rack member 108 has an upper rack portion 109 and a slot 110 in the side wall thereof. There is a pin 111 which fits the slot 110 slidably and along which the member 108 may have movement. The rack portion 109 of the member 108 is engagable with the pinion gear 28 of the timer motor 25 (of which only the gear 28 is shown) and has a normal initial position out of engagement therewith. There is a member 112 which extends transversely to the member 108 and which is connected thereto by the pin 111. The member 112 has upper and lower slots 113 and 114 in which are slidably seated pin members 115 and 116 respectively. The upper slot 113 has a laterally projecting slot portion 117 providing a shoulder 118. The member 112 has a laterally projecting arm portion 119 to which is pivotally connected a link member 120 as at 121. The member 112 is operable to have longitudinal movement of the slots 114 and 113 along the pins 116 and 115 respectively and when moved to a down position is operable to pivot so that the pin 115 is positioned in the lateral slot portion 117 as indicated in Fig. 11. There is a spring 122 which is connected to the lateral arm 119 as at 123 and which urges the member 112 to have the movement just described for engaging the rack 109 with the pinion gear 28. The link 120 has at its upper end a laterally projecting pin member 124 which slidably fits and seats against the bottom end of a lost motion slot 125 on the end portion 126 of a lever member 127. There is a spring 128 attached to the lever 127 and which pulls it upward against the pin 124 and the linkage 120 to hold the member 112 and the rack member 108 in the disengaged position indicated in Fig. 10, the spring 128 being slightly stronger than the spring 122. The lever 127 has an armature portion 41, as does the lever 38 in Fig. 1, which is cooperable with the electromagnet 42 for operating the gear mechanism herein described. There is a reset lever member 129 which is pivoted at 130 and which is engageable with the pin 124 on the link 120 for moving the same. The lever member 129 is pivotally connected as at 131 to a thrust member 132 which is arranged for operation by the reset member 80.

In operation this gear engaging mechanism functions as follows: When the electromagnet 42 is energized and attracts the armature portion 41 the lever 127 is pulled downward permitting the link 120 to move and the spring 122 to operate and pivot the member 112 to engage the rack 109 with the pinion gear 28 as indicated in Fig. 11. When the member 112 is pivoted as indicated in Fig. 11, the pin 115 is engageable with the shoulder 118 of the lateral slot portion 117 and is operable to resist the reactive thrust of the motor 25 through the pinion gear 28 against the rack 109. If the pinion gear and rack teeth abut rather than mesh upon downward movement of the lever 127, the lever 127 will move through to its down position as in Fig. 11 but the slot 123 will have lost motion relative to the pin 124 and the spring 122 will subsequently cause these gear teeth to be enmeshed. By the arrangement of springs 122 and 128 as shown herein the relay 42 has only to operate against the differential of force between them. If the timing motor moves the rack and operating member through to a locked-out position similar to that shown in Fig. 6 the reset member 80 upon actuation is operable to move the link 132 to manually disengage the rack 109 from the pinion gear 28 so that the necessity for the reset switch 21 is eliminated when this type of gear engaging mechanism is used with the system of Fig. 1.

In the form of the invention shown in Fig. 12 the system is substantially identical to that of Fig. 1 except that the switch operating member 32 is operated by a planetary gear mechanism. The timer motor 25 has a pinion gear 28 on its shaft which functions as the sun gear of a planetary gear mechanism generally designated as 133. Comprising the planetary gear structure 133 are the sun gear 28, the planet gear 134 and the internal or drum gear 135. The operating member 32 is pivoted on the shaft 27 of the motor 25 and is pinned to the planet gear 134 as at 136. There is a strip or wire 137 which is looped around the drum gear 135 and which is operable as a brake therefor. The wire 137 is secured at one end as at 138 and is connected at its other end to one end of a lever 139 as at 140. The lever 139 is urged by a spring 141 toward a brake-loosened position and has an armature portion 142 which is cooperable with the electromagnet 42. The spring 57 which is connected to the operating member 32 is operable to hold the member 32 in a switch opened position as in Fig. 1.

The operation of this system is the same as that shown and described for Fig. 1 with the exception that the electromagnet 42 when energized instead of moving gears into engagement is operable to tighten the brake 137 for the drum gear 135 and thus to cause the motor to transmit pivotal movement to the operating member 32 through the sun gear 28 and the planet gear 134.

Referring to Fig. 13 there is shown a burner control system which is identical in all respects to that of Fig. 1 with the exception that a photoelectric circuit and a flow responsive switch arrangement are provided for controlling the energization of the relay coil 75 in place of the stack switch 101 in Fig. 1. The system of Fig. 13 functions generally the same as that of Fig. 1 in that upon closing of the room thermostat the timer motor is energized and the gear train pulled in to transmit movement to the pivoted operating member and the switches controlled thereby. It should be noted that any of the alternate forms of gear engaging mechanism as are shown in Figs. 8, 10 and 12 could be used in this system in the manner described for the system shown in Fig. 1. In this system the conductors 99 and 103 which are in the circuit to the relay coil 75 are controlled by the open contacts 143 and 144 of a relay switch generally designated as 145. The contact 143 is carried by a movable lever arm 146 having a magnetic armature 147 and held by a spring 148 in an initially open position. There is a relay coil 149 which is operable upon energization to attract the armature 147 and close the contacts 143 and 144 to complete the circuit for energizing the relay coil 75. There is provided a transformer 150 having a primary 151 and a pair of secondary portions 152 and 153. There is also provided an electron tube 154 having a cathode 155, cathode heater 156, screen grid 157, control grid 158 and an anode 159. A pair of conductors 160 and 161 connect the cathode heater 156 to the transformer secondary portion 152. The cathode 155 is connected by a conductor 162 to the cathode heater wire 161 as at 163 which is in turn connected by a conductor 164 to the screen grid 157. The transformer secondary portion 153 is connected to one side of the secondary portion 152 as at 165 and at its other end is connected by the conductor 166 to one side of the relay coil 149. There is a conductor 167 and resistor 168 in series and connecting the other side of the relay coil 149 to the anode 159 of the electron tube 154. A condenser 169 is connected across the relay 149 as at 170 and 171 and is operable to even out the pulsations of electric current supplied by the electron tube 154. The conductor 167 leading to the electron tube anode is also connected to one side of a condenser 172, the other side of which is connected to ground at 173. The control grid 158 of the electron tube 154 is connected by a conductor 174 and a resistor 175 to the cathode 176 of the photoelectric cell 177. The anode 178 of the photocell 177 is connected to ground as at 179. The photocell 177 is positioned adjacent the burner to respond to the occurrence of flame therein and is operable to transmit its response to flame instantaneously to the electron tube 154. There is provided another circuit for controlling the energization of the relay coil 75 which is in parallel with the circuit controlled by the photocell 177 and which comprises two conductors 180 and 181 leading from the conductors 103 and 99 respectively to the open contacts 182 and 183 of a flow or pressure responsive switch mechanism generally designated as 184. The flow or pressure switch 184 and actuating mechanism therefor is shown diagrammatically and any suitable flow or pressure responsive mechanism would serve the purpose. The general requirement of this flow or pressure responsive switch is a flow responsive or pressure responsive means 185 in the fuel line to the burner operable in response to flow of fuel or to fuel line pressure to move to a switch actuating member 186. The switch actuating member 186 has a cam portion 187 thereon which is operable to move the arm 188 carrying the contact 182 to close the contacts 182 and 183 momentarily and then upon either continued or reverse movement to permit these contacts to open. The flow characteristics of the flow or pressure switch 184 are such that the contacts 182 and 183 will be closed upon initiation of fuel flow or fuel pressure indicating fuel flow to the burner and will be reopened a momentary period later by which time fuel will normally have emerged into the burner.

In operation this control system functions as follows: Upon closing the room thermostat 8 the timer motor 25 is energized and the gears are engaged by energization of the electromagnet as was described for the system shown in Fig. 1. Similarly, as the operating member 32 is pivoted and the switch lever 44 moved, the contacts 47 and 48 are first made to energize the blower motor 3 and the ignition 7 and subsequently the contacts 49 and 51 are closed to energize the fuel valve 6. As was described for Fig. 1 when the relay coil 75 is energized and the switch mechanism 60 pulled in the switch contacts 67 and 70 are broken away from the contacts 61 and 62 respectively to deenergize the ignition and the timer motor. Also, upon deenergization of the relay coil 75 subsequent to energization thereof the latch member 77 is operable to restrain the return movement of the switch contact arms 65 and 66 so that the contacts 68 and 71 are moved away from the contacts 69 and 72 respectively to deenergize the system and cause it to assume a safety position. Likewise the release of the switch lever 44 is operable to move the latch member 77 to permit the switch contact arms 65 and 66 to return to their original position. In this form of control system when the blower and ignition are turned on and the fuel valve is opened upon initiation of fuel flow to the burner the flow responsive switch 184 is operable to close the contacts 182 and 183 and establish a completed circuit for the relay coil 75. This energization of the relay coil 75 by the flow switch 184 is operable to deenergize the timer motor and the ignition as was previously described and to cause the switch contact arm 66 to be latched down by the latch member 77. At this point in the operation if flame occurs in the burner the photocell 177 will render the electron tube 154 conductive and permit the energization of the relay coil 149 and cause the same to close the switch contacts 143 and 144 to establish a holding circuit for the relay coil 75 of the switch 60. However, if flame does not occur in the burner substantially simultaneously with the emergence of fuel thereinto the flow responsive switch 184 will open the contacts 182 and 183 after the aforementioned momentary closing and will thus deenergize the relay coil 75 and cause the switch structure 60 to assume the latched-out or safety position previously described. If, for some reason, the flow switch 184 does not function the system will operate as does the system in Fig. 1 with the exception that the photocell circuit will give a faster response to the occurrence of flame than will the stack switch in the circuit of Fig. 1. In the system thus far described it is evident that if the flow switch 184 should not function and flame should not occur in the burner within the predetermined time required for the travel of the cam face 34 of the operating member 32 under the bearing roller 56 the switch lever 44 will move to the locked-out safety position as is shown in Fig. 6. Similarly, if there is a loss of flame from a running or operating position the relay switch structure 60 will assume the latched-out or safety position shown in Fig. 7. As was mentioned with regard to the system of Fig. 1 the timer motor, gear engaging means, and switch structure associated therewith, and the relay switch structure 60, as well as the transformer 9, would probably be encased as a unitary control device for commercial construction. It should be noted that the control device which could be manufactured from the parts of this system just mentioned is a basic control device common to those systems of Fig. 1 and Fig. 13 and can be adapted for use with either a stack switch or a photocell circuit or other flame responsive means, either with or without the flow responsive switch without change of the interior circuits therefor.

In Fig. 14 there is shown a modified burner control system which is somewhat similar to the ones previously described and in which one of the relay coils has been eliminated. In this system there is a burner 201 which is supplied with air by a blower 202 driven by a motor 203 which also drives a fuel pump 204. The fuel pump 204 is operable to supply fuel to the burner nozzle 205 and the supply of fuel to the nozzle is controlled by an electrically operated fuel valve 206, as was the system shown in Fig. 1. There is also provided electric ignition 207, the circuits for which will be described hereafter. There is a transformer 208 having a primary 209 and a secondary 210 which controls the energization of this system. The transformer primary 209 is supplied with electric current from the main power source 211 by conductors 212 and 213. The conductor 213 leads to the contact arm 214 and switch contact 215 which is initially engaged with another contact 216 on a contact arm 217. The circuit for the primary is completed by conductor 218 from the contact arm 217 back to the primary 209. There is a switch means or switch structure generally designated as 219 for controlling the various circuits in this system and which includes a switch operating lever 220 which is pivoted at 221 and which is operable to be moved for switch actuation by a pivoted operating member 222. The switch lever 220 carries on its operating end a plurality of switch operating fingers 223, 224, 225, 226, and 227, the fingers 225, 226 and 227 being of electrical conducting material and interconnected for conduction of electric current to various circuits herein. There is a flexible contact arm 228 carrying a switch contact 229 and which is arranged for movement by the finger 224. The contact 229 is cooperable with a contact 230 which is carried by a flexible contact arm 231 and is limited in its movement by a stop 232. There is another flexible contact arm 233 which carries a contact 234 and which is limited in its downward movement by a stop 235. The contact 234 is cooperable with a contact 236 which is carried by a contact arm 237 which is arranged for operation by the finger 224. There is also provided another contact arm 238 which carries a contact 239 cooperable with the electrical conducting finger 225. There are also provided contact arms 240 and 241 which carry initially closed contacts 242 and 243, the contact arm 240 being limited in its downward movement by a stop 244. The contact arm 241 also carries a contact 245 which is cooperable with the electrical conducting finger 226. The contact arm 217 also carries a contact 246 which is arranged for engagement with the electrical conducting finger 227. One side of the transformer secondary 210 is connected by a conductor 247 to the fixed contact 248 of a room thermostat generally designated as 249. The room thermostat 249 is operable to control the energization of this control system in accordance with the heat requirements of the space being heated by the burner 201. This thermostat may or may not be of the anticipating type but is shown as such for this circuit diagram. The movable contact 250 of the thermostat 249 is carried by a bimetallic blade 251 which is connected to the other side of the secondary 210 by a conductor 252 having an anticipating heater 253 and resistor 254 therein. There is an electric timer motor 255 which is operable to transmit movement to the operating member 222 for operating the switch structure 219. The motor 255 has a shaft 256 with a pinion gear 257 thereon. There is a member 258 pivoted on the shaft 256 for carrying a pair of gears 259 and 260 thereon. The operating member 222 is pivoted as at 261 and has a cam face at its upper end generally designated as 262. The member 222 has at its lower end a sector gear portion 263 which is cooperable with the gear 260. The member 258 is operable to move the gear 260 into and out of engagement with the sector gear 263. There is a gear engaging lever 264 which is pivoted as at 265 and which has a leaf spring portion 266 cooperable with a pin 267 on an extension 268 of the gear engaging member 258. The lever 264 has a portion 269 which is operable as a magnetic armature and is cooperable with the electromagnet 270. The lever 264 has an end portion 271 which is of electrical conducting material and which has two fingers 272 and 273 cooperable with contacts 274 and 275 carried by the flexible contact arms 276 and 277 respectively. The contact arms 276 and 277 are limited in their downward movement by stops 278 and 279. The contact arms 276 and 277 are connected by conductors 280 and 281 to the conductors 213 and 218 and provide a circuit for the transformer primary 209 which is in parallel with the switch contacts 215 and 216. There is a spring 282 which is connected to the operating member 222 and is operable to hold it in the position indicated in Fig. 14. A spring 283 interconnects the lever 264 and the lever 220 and is operable to hold the lever 220 in the initial position indicated in Fig. 14. The blade 251 of the room thermostat 249 is connected by a conductor 284 to a terminal point 285 at which point the circuits divide. From the terminal point 285 conductor 286 leads to the contact arm 237, conductor 287 leads to one side of the electromagnet 270, and conductor 288 leads to the movable contact 289 of a stack switch generally indicated as 290. The switch contact arms 231 and 233 are connected together as at 291 and a conductor 292 leads from the contact arm 228 to one side of the timer motor 255. The other side of the timer motor 255 is connected by a conductor 293 to the transformer secondary 210. The other side of the electromagnet 270 is connected by a conductor 294 to a point 295 on the conductor 293 from the timer motor 255. There is a conductor 296 which connects the fixed contact 297 of the stack switch 290 to the conductor 292 which leads to the timer motor 255. The contact arm 241 is connected by a conductor 298 to one side of the blower motor 203, the other side of which is connected by conductors 299 and 300 to the high voltage primary wire 212. The contact arm 240 is connected by conductor 301 to one side of the primary 302 of the ignition transformer 303, the other side of which is connected by conductor 300 to the high voltage wire 212. The ignition transformer secondary 304 is connected by conductors 305 and 306 to the ignition means or electrodes 207. The switch contact arm 238 is connected by conductor 307 to one side of the fuel valve 206, the other side of which is connected by conductors 308, 299 and 300 to the high voltage wire 212. The switch lever 220 has a downturned end portion 309 which carries a bearing roller 310 against which the cam face 262 moves for operating the switch structure 219. There is also provided a stop 311 limiting the movement of the switch operating member 222 and a reset member 312 which is engageable with the lever 220 for resetting the same.

In operation this system functions generally as follows: When the room thermostat 249 closes calling for heat circuits are established for energizing the timer motor 255 and the gear engaging electromagnet 270. These circuits extend from the transformer secondary 210 by way of conductor 247, contacts 248 and 250, conductors 284 and 288, stack switch contacts 289 and 297, conductors 296 and 292, to one side of the motor 255. From the terminal point 285 conductor 287 runs to one side of the electromagnet 270, the other side of which is connected by conductor 294 to the conductor 293 leading from the other side of the motor 255 to the transformer secondary 210. There is a parallel circuit for energization of the timer motor 255 which bypasses the stack switch 290 and extends from the terminal point 285 by way of conductor 286, switch contacts 236, 234, 230, and 229, and conductor 292 to the motor 255. The last-mentioned circuit for the motor is initially open at contacts 229 and 230 as is seen by reference to Fig. 14. Prior to the closing of the room thermostat contacts the various switches shown are in the positions as indicated in Fig. 14. When the room thermostat 249 is closed and the electromagnet 270 and the timer motor 255 energized the gear 260 is moved into engagement with the sector gear 263 on the switch operating member 222 and this member begins to move for operating the switch structure 219. When the electromagnet 270 moves the lever 264 for engaging the aforementioned gears the end portion 271 is moved to engage the contact fingers 272 and 273 with the switch contacts 274 and 275 to establish a holding circuit for the primary 209 of the transformer 208. The cam face 262 of the switch operating member 222 is operable to be moved by the timer motor 255 under the bearing roller 310 for pivoting the lever 220 and operating the switch structure 219. The cam face 262 is so contoured as to move the lever 220 through successive movements to operate the various switch contacts sequentially as will be described hereafter. Upon initial movement of the cam face 262 under the bearing roller 310 the lever 220 is pivoted to engage the finger 223 with the contact arm 228 and move the contact 229 into engagement with the contact 230. When the contacts 229 and 230 are in engagement the aforementioned parallel circuit for energizing the motor 255 is closed. The fingers 226 and 227 on the lever 220 are positioned to engage the contacts 245 and 246 respectively and to break the contact 216 away from the contact 215. The establishment of the last-named contacts and the breaking of the contacts 215 and 216 are operable to open the initial circuit for the transformer primary 209 which remains energized through the switch contacts 274 and 275 and to establish a circuit for the blower and ignition. The blower and ignition are energized by a high voltage circuit extending by way of conductor 218, switch contact arm 217, contacts 227 and 246, and contacts 226 and 245. From contact 245 the circuit splits and goes by way of contact arm 240 and conductor 301 to the ignition transformer and by way of contact arm 241 and conductor 298 to the blower motor. A short predetermined further movement brings the cam face 262 to a slightly higher contour to move the lever 220 a small distance further necessary to make contact between the finger 225 and contact 239 to establish a circuit by way of conductor 307 to the fuel valve 206. By this construction the sequential operation of the blower and ignition and fuel valve is accomplished similarly to that described for the previous forms of control system. Upon a short predetermined further movement of the operating member 222 the cam face 262 is moved to a still higher contour which pivots the lever 220 further and causes the finger 226 to flex the contact arm 241 and move the contact 243 away from the contact 242, the contact arm 240 by this time having engaged the stop 244. Upon opening of the contacts 242 and 243 the circuit to the ignition transformer is broken but the circuits to the blower motor and fuel valve are maintained as their contacts are still in engagement. Upon a predetermined further movement of the operating member 222 the cam face 262 is moved to its highest contour at the extreme right edge thereof and the finger 224 is operable thereby to engage the contact arm 237 and open the contacts 234 and 236. By the opening of the contacts 234 and 236 one of the parallel circuits for energizing the timer motor 255 is opened and the control of this motor is at this point entirely determined by the stack switch 290. The stack switch 290 has normally closed contacts which are operable to be opened upon occurrence of flame in the burner and so if flame has occurred in the burner by the time the contacts 234 and 236 are opened or occurs in the burner a very short time thereafter the stack switch contacts 289 and 287 will be opened and the timer motor 255 deenergized to stop further movement of the operating member 222. If flame does not occur in the burner within the predetermined time required for the cam face 262 to move completely under the bearing roller 310 the motor 255 will continue movement of the member 222 until the bearing roller 310 drops over the edge of the member 222 and pivots the lever 220 upward to open the switches which were previously closed and close the switches which were previously opened thereby and assume a locked-out position similar to that shown in Fig. 6. The lever 220 can be manually moved by the reset member 312 to move the bearing roller 310 and downturned lever portion 309 out of latching engagement with the operating member 222 to permit the system to be re-started after a safety operation. If the system has started normally and flame has occurred in the burner the timer motor 255 is stopped and the aforementioned safety operation does not occur but, if for some reason, flame fails from a running or operating position the stack switch contacts 289 and 287 will reclose and establish a circuit to start the timer motor 255 and thus move the operating member 222 through to a safety lock-out position. Further movement of the operating member 222 after reaching a lock-out position is prevented by engagement thereof with the stop member 311 which is operable to stop further movement and thus stall the motor 255.

From the foregoing it is seen that there is provided herein a simple burner control system whereby the blower, ignition, and fuel supply are turned on for a predetermined time and the ignition is then turned off, all this done by a timing motor and switch structure associated therewith and if flame does not occur within a predetermined time in the burner, the timing motor moves the operating member and switch structure to a safety lock-out position. It should be noted that although the gear engaging mechanism shown for this form of system is that illustrated in Fig. 1, any of the alternate forms shown in subsequent figures could be used by merely adding the switch structure 271, 272 and 273 on the end of the member which is actuated by the gear engaging electromagnet. It should also be noted that although a normally closed thermostatic stack switch is shown for deenergizing the timer motor upon occurrence of flame a photocell circuit or any other flame response could be used which would be satisfactory for opening a normally closed switch controlling the timer motor. By use of the two sequential switches formed by contacts 229, 230 and contacts 234, 236 which are initially open and subsequently close and later reopen a parallel circuit for the timer motor, the timer motor is prevented from operating in the event of a false indication of a flame by the flame responsive switch or in any event that the flame responsive switch is held open. It should also be noted by providing two circuits for energizing the transformer primary 209, one of which is initially closed and is opened by the timer motor and the other of which is initially open and is closed by the gear engaging electromagnet, the system is prevented from functioning in the event that the switch operating lever 220 is jammed down in an actuated position.

Having thus described the invention what is claimed and desired to be secured by Letters Patent of the United States is:

1. In a burner control system, a burner, electrically controlled means for supplying fuel to said burner, electrical ignition means for said burner, circuits for said fuel supply means and said ignition means, a first switch means controlling energization of said fuel supply means and said ignition means, operating means biased in one direction to an initial inoperative position and operable upon movement in the other direction to close and subsequently to reopen said switch means, electrically operated timing means operable to move said operating means in said other direction to actuate said first switch means, electrically operated releasable means having an actuated position operable to transmit movement from said timing means to said operating means, said releasable means being operable upon release from said actuated position to permit said operating means to return to said initial position to open said first switch means, electric circuit means controlling energization of said timing means and said releasable means, a second switch means controlling said ignition means and said timing means, and means responsive to the occurrence of flame in said burner and controlling said second switch means, said responsive means and said second switch means being jointly operable upon occurrence of flame in said burner within a predetermined time after the closing of said first switch means to deenergize said timing means and said ignition means to prevent the reopening of said first switch means by said timing means.

2. In a burner control system, a burner, electrically operated means for supplying fuel to said burner, electrical ignition means for said burner, circuits for said fuel supply means and said ignition means, a first switch means controlling energization of said fuel supply means and said ignition means, an operating member biased in one direction to an initial inoperative position and operable upon movement in the other direction to close and subsequently to reopen said switch means, an electric motor operable as a timing means for moving said operating member in said other direction to actuate said first switch means, electrically operated releasable means having an actuated position operable to transmit movement from said motor to said operating member, said releasable means being operable upon release from said actuated position to permit said operating member to return to said initial position to open said first switch means, electric circuit means controlling energization of said motor and said releasable means, a second switch means controlling the energization of said ignition means and said electric motor, means responsive to the occurrence of flame in said burner and controlling said second switch means, and said responsive means being operable upon occurrence of flame in said burner within a predetermined time after the closing of said first switch means to open said second switch means to deenergize said ignition means and said electric motor and thereby to prevent the reopening of said first switch means by said operating member.

3. In a burner control system, a burner, electrically operated means for supplying fuel to said burner, electrical ignition means for said burner, circuits for said fuel supply means and said ignition means, a first switch means controlling energization of said fuel supply means and said ignition means, an operating member for actuating said switch means, said operating member being biased in one direction to an initial inoperative position and operable upon movement in the other direction to close and subsequently to reopen said switch means, an electric motor operable as a timing means for moving said operating member, gear means for transmitting movement from said motor to said operating member, electrically operated means for effecting an operative engagement of said gear means for transmitting movement to said operating member, said electrically operated means being operable upon deenergization to release said operating member for return to said initial position, a room thermostat controlling energization of said electric motor and said electrically operated means, a second switch means controlling the energization of said ignition means and said electric motor, means responsive to the occurrence of flame in said burner and controlling said second switch means, and said responsive means being operable upon occurrence of flame in said burner within a predetermined time after the closing of said first switch means to open said second switch means to deenergize said ignition means and said electric motor and thereby to prevent the reopening of said first switch means by said operating member.

4. In a burner control system, a burner, electrically operated means for supplying fuel to said burner, electrical ignition means for said burner, circuits for said fuel supply means and said ignition means, a first switch means controlling energization of said fuel supply means and said ignition means, an operating member for actuating said switch means, said operating member being biased in one direction to an initial inoperative position and operable upon movement in the other direction to close and subsequently to reopen said switch means, an electric motor operable as a timing means for moving said operating member, gear means for transmitting movement from said motor to said operating member and having portions one of which is movable into and out of engagement with the other, electromagnetic means for moving said one portion into engagement for transmitting movement, said electromagnetic means being operable upon deenergization to release said operating member for return to said initial position, a room thermostat controlling energization of said electric motor and said electromagnetic means, a second switch means controlling the energization of said ignition means and said electric motor, means responsive to the occurrence of flame in said burner and controlling said second switch means, and said responsive means being operable upon occurrence of flame in said burner within a predetermined time after the closing of said first switch means to open said second switch means to deenergize said ignition means and said electric motor and thereby to prevent the reopening of said first switch means by said operating member.

5. In a burner control system, a burner, electrically operated means for supplying fuel to said burner, electrical ignition means for said burner, circuits for said fuel supply means and said ignition means, a first switch means controlling energization of said fuel supply means and said ignition means, an operating member for moving said switch means and operable upon movement to close and subsequently to reopen the same, an electric motor operable as a timing means for moving said operating member, gear means for transmitting movement from said motor to said operating member, electrically operated means for effecting an operative engagement of said gear means for transmitting movement to said operating member, a room thermostat controlling energization and deenergization of said electric motor and said electrically operated means, a spring connected to said operating member for returning the same to its initial starting position upon deenergization and release of said electrically operated means, a second switch means controlling the energization of said ignition means and said electric motor, means responsive to the occurrence of flame in said burner and controlling said second switch means, said responsive means being operable upon occurrence of flame in said burner within a predetermined time after the closing of said first switch means to open said second switch means to deenergize said ignition means and said electric motor and thereby to prevent the reopening of said first switch means by said operating member, and means operable in the event of reopening of said first switch means by continued movement of said operating member to hold said operating member in an actuated position independently of and subsequent to deenergization of said electrically operated means by said room thermostat.

6. In a burner control system, a burner, electrically operated means for supplying fuel to said burner, electrical ignition means for said burner, circuits for said fuel supply means and said ignition means, a first switch means controlling energization of said fuel supply means and said ignition means and including a contact making lever, said switch lever having a downwardly projecting bearing portion, an operating member operable upon initial movement to engage said lever projecting portion to move said lever to close said switch means and upon continued movement to reopen said switch means, an electric motor operable as a timing means for moving said operating member, gear means for transmitting movement from said motor to said operating member and having portions one of which is movable into and out of engagement with the other, an operating lever having a magnetic armature portion and operable upon movement to move said one gear portion into engagement with the other, an electromagnet operable upon energization to attract said armature portion and move said lever, a room thermostat controlling energization of said motor and said electromagnet, a spring connected to said operating member for returning the same to its initial starting position upon deenergization of said electromagnet, a second switch means controlling the energization of said ignition means and said motor, means responsive to the occurrence of flame in said burner and controlling said second switch means, said responsive means being operable upon occurrence of flame in said burner within a predetermined time after the closing of said first switch means to open said second switch means to deenergize said ignition means and said motor and thereby to prevent the reopening of said first switch means by continued movement of said operating member, said motor being operable in the event of failure of said second switch means to open to continue to move said operating member until said switch lever projection slips over one edge of said operating member, and said last-named movement of said switch lever being operable to open said first switch means and to position said projection as a catch to prevent the return of said operating member to said initial position upon a subsequent deenergization of said electromagnet by opening said room thermostat.

7. In a burner control system, a burner, electrically controlled means for supplying fuel to said burner, an electrically operated blower for supplying air to said burner, an electric ignition for said burner, circuits for said fuel supply means, said blower and said ignition, a first switch means including two switches operated sequentially and operable first to energize said blower and said ignition and subsequently to energize said fuel supply means, operating means biased in one direction to an initial inoperative position and operable upon movement in the other direction to close said first switch means and upon continued operation to reopen the same, electrically operated timing means operable to move said operating means in said other direction to actuate said first switch means, electrically operated releasable means having an actuated position operable to transmit movement from said timing means to said operating means, said releasable means being operable upon release from said actuated position to permit said operating means to return to said initial position to open said first switch means, electric circuit means controlling energization of said timing means and said releasable means, a second switch means movable to control energization of said ignition and said timing means, and means responsive to the occurrence of flame in said burner and controlling said controlling movement of said second switch means.

8. In a burner control system, a burner, electrically controlled means for supplying fuel to said burner, an electrically operated blower for supplying air to said burner, an electric ignition for said burner, circuits for said fuel supply means, said blower and said ignition, a first switch means including two switches operated sequentially and operable first to energize said blower and said ignition and subsequently to energize said fuel supply means, an operating member for actuating said switch means biased in one direction to an initial inoperative position and operable upon initial movement in the other direction to close said switch means and upon continued movement to reopen the same, an electric motor operable as a timing means for moving said operating member, releasable means controlling the transmission of movement from said motor to said operating member and operable upon release to permit said operating member to return in said one direction to said initial position, electric circuit means controlling energization of said motor and said releasable means, a second switch means controlling said ignition and said timing motor, means responsive to the occurrence of flame in said burner and controlling said second switch means, and said responsive means being operable upon occurrence of flame in said burner within a predetermined time after the closing of said first switch means to open said second switch means to deenergize said ignition and said timing motor and thereby to prevent the reopening of said first switch means by continued movement of said operating member.

9. In a burner control system, a burner, electrically operated means for supplying fuel to said burner, an electrically operated blower for supplying air to said burner, an electric ignition for said burner, circuits for said fuel supply means, said blower and said ignition, a first switch means including two sequentially operated switches operable first to energize said blower and said ignition and subsequently to energize said fuel supply means, said switch means including a contact making lever, said switch lever having a downwardly projecting bearing portion, an operating member operable upon initial movement to engage said lever projecting portion to move said lever to close said switch means and upon continued movement to reopen said switch means, an electric motor operable as a timing means for moving said operating member, gear means for transmitting movement from said motor to said operating member and having portions one of which is movable into and out of engagement with the other, an operating lever having a magnetic armature portion and operable upon movement to move said one gear portion into engagement with the other, an electromagnet operable upon energization to attract said armature portion and move said lever, a room thermostat controlling energization of said motor and said electromagnet, a spring connected to said operating member for returning the same to its initial starting position upon deenergization of said electromagnet, a second switch means controlling the energization of said ignition and said motor, means responsive to the occurrence of flame in said burner and controlling said second switch means, said responsive means being operable upon occurrence of flame in said burner within a predetermined time after the closing of said first switch means to open said second switch means to deenergize said ignition and said motor and thereby to prevent the reopening of said first switch means by continued movement of said operating member, said motor being operable in the event of failure of said second switch means to open to continue to move said operating member until said switch lever projection slips over one edge of said operating member, and said last-named movement of said switch lever being operable to open said first switch means and to position said projection as a catch to prevent the return of said operating member to said initial position upon a subsequent deenergization of said electromagnet by opening said room thermostat.

10. In a burner control system, a burner, electrically controlled means for supplying fuel to said burner, an electric ignition for said burner, electric circuits for said fuel supply means and said ignition, a first switch means controlling energization of said fuel supply means and said ignition, electrically operated timing means having a circuit and operable upon initial movement to close and upon subsequent movement to reopen said switch means, means controlling energization of said timing means circuit, relay switch means having a coil and circuit therefor and comprising first and second switch portions each initially closed, said first relay switch portion controlling the energization of said ignition and said timing means circuits, said second relay switch portion controlling the energization of said fuel supply means, said ignition, said timing means, and said relay coil circuits, said relay coil being operable upon energization to open said first relay switch portion, means responsive to the occurrence of flame in said burner and controlling the energization of said relay coil circuit, said responsive means being operable upon occurrence of flame in said burner within a predetermined time after the closing of said first switch means to energize said relay coil and open said first relay switch portion to deenergize said ignition and said timing means circuits to prevent the reopening of said first switch means by continued operation of said timing means, and means cooperable with said second relay switch portion and operable to cause the same to be opened upon deenergization of said relay coil.

11. In a burner control system, a burner, electrically controlled means for supplying fuel to said burner, an electric ignition for said burner, electric circuits for said fuel supply means and said ignition, a first switch means controlling energization of said fuel supply means and said ignition, electrically operated timing means having a circuit and operable upon initial movement to close and upon subsequent movement to reopen said switch means, means controlling energization of said timing means circuit, relay switch means having a coil and circuit therefor and comprising first and second switch portions each initially closed, said first relay switch portion controlling the energization of said ignition and said timing means circuits, said second relay switch portion controlling the energization of said fuel supply means, said ignition, said timing means, and said relay coil circuits, said relay coil being operable upon energization to open said first relay switch portion, means responsive to the occurrence of flame in said burner and controlling the energization of said relay coil circuit, said responsive means being operable upon occurrence of flame in said burner within a predetermined time after the closing of said first switch means to energize said relay coil and open said first relay switch portion to deenergize said ignition and said timing means circuits to prevent the reopening of said first switch means by continued operation of said timing means, a mechanical catch cooperable with said second relay switch portion and operable to cause the same to be opened upon deenergization of said relay coil, and said first switch means being cooperable with said catch and operable upon opening movement thereof to release said catch to permit said second relay switch portion to close.

12. In a burner control system, a burner, electrically controlled means for supplying fuel to said burner, an electric ignition for said burner, electric circuits for said fuel supply means and said ignition, a first switch means controlling energization of said fuel supply means and said ignition, an operating member for actuating said switch means and operable upon initial movement to close and upon continued movement to reopen the same, an electric motor operable as a timing means for moving said operating member, a circuit for said electric motor, gear means for transmitting movement from said motor to said operating member, electrically operated means for effecting an operative engagement of said gear means for transmitting movement to said operating member, a circuit for said electrically operated means, a room thermostat controlling energization of said electric motor and said electrically operated means circuits, relay switch means having a coil and circuit therefor and comprising first and second switch portions each initially closed, said first relay switch portion controlling the energization of said ignition and said timing motor circuits, said second relay switch portion controlling the energization of said fuel supply means, said ignition, said timing motor, and said relay coil circuits, said relay coil beng operable upon energization to open said first relay switch portion, means responsive to the occurrence of flame in said burner and controlling the energization of said relay coil, said responsive means being operable upon occurrence of flame in said burner within a predetermined time after the closing of said first switch means to energize said relay coil and open said first relay switch portion to deenergize said ignition and said timing motor circuits to prevent the reopening of said first switch means by continued operation of said timing motor, a mechanical catch cooperable with said second relay switch portion and operable to cause the same to be opened upon deenergization of said relay coil, and said first switch means being cooperable with said catch and operable upon opening movement thereof to release said catch to permit said second relay switch portion to close.

13. In a burner control system, a burner, electrically controlled means for supplying fuel to said burner, an electric ignition for said burner, electric circuits for said fuel supply means and said ignition, a first switch means controlling the energization of said fuel supply means and said ignition circuits, electrically operated timing means having a circuit and operable upon initial movement to close and upon subsequent movement to reopen said switch means; means controlling energization of said timing means circuit, relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact having a normal initial engagement with one of the other contacts of said first contact arms, said relay switch means having a coil and circuit therefor and operable upon energization to move said first contact arms and their contacts away from said fixed contacts and to move said second contact arms therewith, said first-named movable contacts and said fixed contacts defining first and second relay switch portions controlling the energization of said ignition and said timing means circuits respectively, said second-named movable contacts and the other contacts of said first contact arms defining third and fourth relay switch portions, said third relay switch portion controlling the energization of said fuel supply means and said ignition circuits, said fourth relay switch portion controlling the energization of said timing means and said relay coil circuits, means responsive to the occurrence of flame in said burner and controlling said relay coil circuit, said responsive means being operable upon occurrence of flame in said burner within a predetermined time after the closing of said first switch means to energize said relay coil and move said first and said second contact arms to open said first and said second relay switch portions to deenergize said ignition and said timing means circuits and thereby to prevent reopening of said first switch means by continued operation of said timing means, and a mechanical catch cooperable with said second contact arms when in an actuated position and operable to restrain the return movement of the same so that upon deenergization of said relay coil said first contact arms may move away from said second contact arms to open said third and fourth relay switch portions.

14. In a burner control system, a burner, electrically controlled means for supplying fuel to said burner, an electric ignition for said burner, electric circuits for said fuel supply means and said ignition, a first switch means controlling the energization of said fuel supply means and said ignition circuits, electrically operated timing means having a circuit and operable upon initial movement to close and upon subsequent movement to reopen said switch means, means controlling energization of said timing means circuit, relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact having a normal initial engagement with one of the other contacts of said first contact arms, said relay switch means having a coil and circuit therefor and operable upon energization to move said first contact arms and their contacts away from said fixed contacts and to move said second contact arms therewith, said first-named movable contacts and said fixed contacts defining first and second relay switch portions controlling the energization of said ignition and said timing means circuits respectively, said second-named movable contacts and the other contacts of said first contact arms defining third and fourth relay switch portions, said third relay switch portion controlling the energization of said fuel supply means and said ignition circuit, said fourth relay switch portion controlling the energization of said timing means and said relay coil circuits, means responsive to the occurrence of flame in said burner and controlling said relay coil circuit, said responsive means being operable upon occurrence of flame in said burner within a predetermined time after the closing of said first switch means to energize said relay coil and move said first and said second contact arms to open said first and said second relay switch portions to deenergize said ignition and said timing means circuits and thereby to prevent reopening of said first switch means by continued operation of said timing means, a mechanical catch cooperable with said second contact arms when in an actuated position and operable to restrain the return movement of the same so that upon deenergization of said relay coil said first contact arms may move away from said second contact arms to open said third and fourth relay switch portions, and said first switch means being engageable with said catch and operable upon opening movement thereof to release said catch to permit said second contact arms to move and close said third and fourth relay switch portions.

15. In a burner control system, a burner, electrically operated means for supplying fuel and air to said burner, an electric ignition for said burner, parallel electric circuits for said fuel supply means and said ignition, a first switch having a pair of initially open contacts in a circuit portion common to said ignition and said blower circuits, a lever carrying one of said contacts and spring loaded toward an open position, said lever having a downturned bearing portion, a pivoted operating member having a cam surface engageable with said lever bearing portion and operable upon initial movement thereunder to pivot said lever to close said contacts and upon continued movement to reopen said contacts, a spring holding said operating member in an initial position permitting said lever to assume a switch open position, an electric motor operable as a timing means for moving said operating member, a circuit for said motor, gear means for transmitting movement from said motor to said operating member and having portions one of which is movable into and out of engagement with the other, a lever having a magnetic armature portion and operable upon movement to move said one gear portion into engagement with the other, said gear engaging lever being spring loaded toward a gear disengaged position, an electromagnet operable upon energization to attract said armature portion for engaging said gear portions, a circuit for said electromagnet, a circuit portion common to said motor and said electromagnet circuits, a room thermostat in said last named circuit portion; relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact and spring biased for a normal initial engagement with one of the other contacts of said first contact arms, said relay switch means having a coil operable upon energization to move said first contact arms and their contacts away from said fixed contacts and to move said second contact arms therewith, a circuit for said relay coil; one of said fixed contacts and the first and second contact arms cooperable therewith defining a first switch portion in said ignition circuit, said last-named contact arms and their contacts defining a second switch portion in said fuel supply means circuit, the other of said fixed contacts and the first and second contact arms cooperable therewith defining a third switch portion in said motor circuit, said last-named contact arms and their contacts defining a fourth switch portion in said relay coil circuit, means responsive to the occurrence of flame in said burner and controlling the energization of said relay coil, said responsive means being operable upon occurrence of flame in said burner within a predetermined time after the closing of said first switch to energize said relay coil and move said first and said second contact arms away from said fixed contacts to open said motor and said ignition circuits, a mechanical latch cooperable with said second contact arms when in an actuated position and operable to restrain the return movement of the same so that upon deenergization of said relay coil said first contact arms may move away from said second contact arms to open said fuel supply means, motor, ignition and relay coil circuits, said first switch lever being engageable with said latch and operable upon opening movement thereof to release said latch to permit said second contact arms to move and make contact with said first contact arms, said motor being operable in the event of failure of said responsive means to open said relay switch means to continue to move said operating member until said lever bearing portion slips over one edge of said operating member, and said last-named movement of said switch lever being operable to open said first switch and to position said bearing portion as a catch to prevent the return of said operating member upon subsequent deenergization of said gear engaging electromagnet by opening said room thermostat.

16. In a burner control system, a burner, electrically operated pumping means for supplying fuel and air to said burner, an electric ignition for said burner, parallel electric circuits for said pumping means and said ignition, an electrically operated valve controlling the flow of fuel to said burner, a circuit for said fuel valve, a first switch means comprising two switches one of which is in a circuit portion common to said pumping means and said ignition circuits and the other in said fuel valve circuit, said switches being arranged for sequential operation to energize said pumping means and ignition prior to said fuel valve and having an initial open position, a switch operating lever spring loaded toward a switch open position, said lever having a downturned bearing portion, a pivoted operating member having a cam surface engageable with said lever bearing portion and operable upon initial movement thereunder to pivot said lever to close said switches and upon continued movement to reopen said switches, a spring holding said operating member in an initial position permitting said lever to assume a switch open position, an electric motor operable as a timing means for moving said operating member, a circuit for said motor, gear means for transmitting movement from said motor to said operating member and having portions one of which is movable into and out of engagement with the other, a lever having a magnetic armature portion and operable upon movement to move said one gear portion into engagement with the other, said gear engaging lever being spring loaded toward a gear disengaged position, an electromagnet operable upon energization to attract said armature portion for engaging said gear portions, a circuit for said electromagnet, a circuit portion common to said motor and said electromagnet circuits, a room thermostat in said last-named circuit portion; relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact and spring biased for a normal initial engagement with one of the other contacts of said first contact arms, said relay switch means having a coil operable upon energization to move said first contact arms and their contacts away from said fixed contacts and to move said second contact arms therewith, a circuit for said relay coil; one of said fixed contacts and the first and second contact arms cooperable therewith defining a first switch portion in said ignition circuit, said last-named contact arms and their contacts defining a second switch portion in said pumping means circuit, the other of said fixed contacts and the first and second contact arms cooperable therewith defining a third switch portion in said motor circuit, said last-named contact arms and their contacts defining a fourth switch portion in said relay coil circuit, a thermostatic stack switch responsive to the occurrence of flame in said burner and controlling the energization of said relay coil, said stack switch being operable upon occurrence of flame in said burner within a predetermined time after the closing of said first switch means to energize said relay coil and move said first and said second contact arms away from said fixed contacts to open said motor and said ignition circuits, a mechanical latch cooperable with said second contact arms when in an actuated position and operable to restrain the return movement of the same so that upon deenergization of said relay coil said first contact arms may move away from said second contact arms to open said pumping means, motor, ignition and relay coil circuits, said first switch lever being engageable with said latch and operable upon opening movement thereof to release said latch to permit said second contact arms to move and make contact with said first contact arms, said motor being operable in the event of failure of said stack switch to open said relay switch means to continue to move said operating member until said lever bearing portion slips over one edge of said operating member, and said last-named movement of said switch lever being operable to open said first switch means and to position said bearing portion as a catch to prevent the return of said operating member upon subsequent deenergization of said gear engaging electromagnet by opening said room thermostat.

17. In a burner control system, a burner, electrically operated pumping means for supplying fuel and air to said burner, an electric ignition for said burner, parallel electric circuits for said pumping means and said ignition, an electrically operated valve controlling the flow of fuel to said burner, a circuit for said fuel valve, a first switch means comprising two switches one of which is in a circuit portion common to said pumping means and said ignition circuits and the other in said fuel valve circuit, said switches being arranged for sequential operation to energize said pumping means and ignition prior to said fuel valve and having an initial open position, a switch operating lever spring loaded toward a switch open position, said lever having a down-turned bearing portion, a pivoted operating member having a cam surface engageable with said lever bearing portion and operable upon initial movement thereunder to pivot said lever to close said switches and upon continued movement to reopen said switches, a spring holding said operating member in an initial position permitting said lever to assume a switch open position, an electric motor operable as a timing means for moving said operating member, a circuit for said motor, gear means for transmitting movement from said motor to said operating member and having portions one of which is movable into and out of engagement with the other, a lever having a magnetic armature portion and operable upon movement to move said one gear portion into engagement with the other, said gear engaging lever being spring loaded toward a gear disengaged position, an electromagnet operable upon energization to attract said armature portion for engaging said gear portions, a circuit for said electromagnet, a circuit portion common to said motor and said electromagnet circuits, a room thermostat in said last-named circuit portion; relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact and spring biased for a normal initial engagement with one of the other contacts of said first contact arms, said relay switch means having a coil operable upon energization to move said first contact arms and their contacts away from said fixed contacts and to move said second contact arms therewith, a circuit for said relay coil; one of said fixed contacts and the first and second contact arms cooperable therewith defining a first switch portion in said ignition circuit, said last-named contact arms and their contacts defining a second switch portion in said pumping means circuit, the other of said fixed contacts and the first and second contact arms cooperable therewith defining a third switch portion in said motor circuit, said last-named contact arms and their contacts defining a fourth switch portion in said relay coil circuit, a photo-electric cell and circuit therefor responsive to the occurrence of flame in said burner and controlling the energization of said relay coil, said photo-electric cell and circuit being operable upon occurrence of flame in said burner within a predetermined time after the closing of said first switch means to energize said relay coil and move said first and said second contact arms away from said fixed contacts to open said motor and said ignition circuits, a mechanical latch cooperable with said second contact arms when in an actuated position and operable to restrain the return movement of the same so that upon deenergization of said relay coil said first contact arms may move away from said second contact arms to open said pumping means, motor, ignition and relay coil circuits, said first switch lever being engageable with said latch and operable upon opening movement thereof to release said latch to permit said second contact arms to move and make contact with said first contact arms, said motor being operable in the event of failure of said photo-electric cell and circuit to open said relay switch means to continue to move said operating member until said lever bearing portion slips over one edge of said operating member, and said last-named movement of said switch lever being operable to open said first switch means and to position said bearing portion as a catch to prevent the return of said operating member upon subsequent deenergization of said gear engaging electromagnet by opening said room thermostat.

18. In a burner control system, a burner, electrically controlled means for supplying fuel to said burner, an electric ignition for said burner, circuits for said fuel supply means and said ignition, a first switch means controlling energization of said fuel supply means and said ignition circuits, electrically operated timing means having a circuit and operable upon initial movement to close and upon continued movement to reopen said switch means, means controlling energization of said timing means circuit, relay switch means having a relay coil and an electric circuit therefor; said relay switch means having an initial closed position with closed contacts in said fuel supply means, said ignition, said timing means, and said relay coil circuits, a first open position with open contacts in said ignition and said timing means circuits, a second open position with open contacts in all of said circuits; said relay switch means assuming said first open position upon energization of said relay coil, means cooperable with said relay switch means to cause the same to assume said second open position upon deenergization of said relay coil subsequent to energization thereof, means operated in response to opening of said first switch means to release said relay switch means from said second open position to permit it to assume said closed position, means responsive to the occurrence of flame in said burner and operable to energize said relay coil, and a switch in circuit with said relay coil and operable in response to flow of fuel to said burner to momentarily energize and then deenergize said coil so that said relay switch means may assume said first open position only in the event that said coil is energized by said flame responsive means prior to its deenergization by said last-named switch.

19. In a burner control system, a burner, electrically controlled means for supplying fuel to said burner, an electric ignition for said burner, circuits for said fuel supply means and said ignition, a first switch means controlling energization of said fuel supply means and said ignition circuits, electrically operated timing means having a circuit and operable upon initial movement to close and upon continued movement to reopen said switch means, means controlling energization of said timing means circuit, relay switch means having a relay coil and an electric circuit therefor; said relay switch means having an initial closed position with closed contacts in said fuel supply means, said ignition, said timing means, and said relay coil circuits, a first open position with open contacts in said ignition and said timing means circuits, a second open position with open contacts in all of said circuits; said relay switch means assuming said first open position upon energization of said relay coil, means cooperable with said relay switch means to cause the same to assume said second open position upon deenergization of said relay coil subsequent to energization thereof, means operated in response to opening of said first switch means to release said relay switch means from said second open position to permit it to assume said closed position, means responsive to the occurrence of flame in said burner and operable to energize said relay coil, and a switch in circuit with said relay coil and operable to momentarily energize and then deenergize said coil so that said relay switch means may assume said first open position only in the event that said coil is energized by said flame responsive means prior to its deenergization by said last-named switch, said last-named switch including a means responsive to the flow of fuel to said burner and operable to close upon initiation of flow and open immediately after the emergence of fuel at the burner so that said fuel supply means and said ignition will be deenergized in the event that flame does not occur in said burner substantially simultaneously with the emergence of fuel thereinto.

20. In a burner control system, a burner, electrically controlled means for supplying fuel to said burner, an electric ignition for said burner, electric circuits for said fuel supply means and ignition, a first switch means controlling energization of said fuel supply means and said ignition circuits, electrically operated timing means having a circuit and operable upon initial movement to close and upon subsequent movement to reopen said switch means, means controlling energization of said timing means circuit, relay switch means having a coil and circuit therefor and comprising first and second switch portions each initially closed, said first relay switch portion controlling the energization of said ignition and said timing means circuits, said second relay switch portion controlling the energization of said fuel supply means, said ignition, said timing means, and said relay coil circuits, said relay coil being operable upon energization to open said first relay switch portion, means responsive substantially instantly to the occurrence of flame in said burner to energize said relay coil, a mechanical catch cooperable with said second relay switch portion when said first relay switch portion is opened and operable to cause said second relay switch portion to be opened upon deenergization of said relay coil, said first switch means being cooperable with said catch and operable upon opening movement thereof to release said catch to permit said second relay switch portion to close, a switch in circuit with said relay coil and including a means responsive to the flow of fuel to said burner and operable to close upon initiation of flow and open immediately after the emergence of fuel at the burner, and the closing and opening of said last-named switch being operable to energize and subsequently deenergize said relay coil so that said second relay switch portion will be opened and all of the control circuits deenergized in the event that the relay coil is not energized by said flame responsive means prior to its deenergization by the opening of said flow responsive switch, said flow responsive switch and said flame responsive means thus providing for the deenergization of said fuel supply means and said ignition in the event that flame does not occur in said burner substantially simultaneously with the emergence of fuel thereinto.

21. In a burner control system, a burner, electrically controlled means for supplying fuel to said burner, an electric ignition for said burner, electric circuits for said fuel supply means and ignition, a first switch means controlling the energization of said fuel supply means and said ignition circuits, electrically operated timing means having a circuit and operable upon initial movement to close and upon subsequent movement to reopen said switch means; means controlling energization of said timing means circuit, relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact having a normal initial engagement with one of the other contacts of said first contact arms, said relay switch means having a coil and circuit therefor and operable upon energization to move said first contact arms and their contacts away from said fixed contacts and to move said second contact arms therewith, said first-named movable contacts and said fixed contacts defining first and second relay switch portions controlling the energization of said ignition and said timing means circuits respectively, said second-named movable contacts and the other contacts of said first contact arms defining third and fourth relay switch portions, said third relay switch portion controlling the energization of said fuel supply means and said ignition circuits, said fourth relay switch portion controlling the energization of said timing means and said relay coil circuits, means responsive to the occurrence of flame in said burner and operable to energize said relay coil, said relay coil being operable upon energization to move said first and said second contact arms to open said first and said second relay switch portions to deenergize said ignition and said timing means circuits and thereby to prevent reopening of said first switch means by continued operation of said timing means, a mechanical catch cooperable with said second contact arms when in an actuated position and operable to restrain the return movement of the same so that upon deenergization of said relay coil said first contact arms may move away from said second contact arms to open said third and fourth relay switch portions, said first switch means being engageable with said catch and operable upon opening movement thereof to release said catch to permit said second contact arms to move and close said third and fourth relay switch portions, a switch in circuit with said relay coil and including a means responsive to the flow of fuel to said burner and operable to close upon initiation of flow and open immediately after the emergence of fuel at the burner, and the opening and closing of said last-named switch being operable to energize and subsequently deenergize said relay coil so that said second contact arms will be latched and said first contact arms moved away therefrom and all of the control circuits therethrough deenergized in the event that the relay coil is not energized by said flame responsive means prior to its deenergization by the opening of said flow responsive switch, said flow responsive switch and said flame responsive means thus providing for the deenergization of said fuel supply means and said ignition circuits in the event that flame does not occur in said burner substantially simultaneously with the emergence of fuel thereinto.

22. In a burner control system, a burner, electrically operated pumping means for supplying fuel and air to said burner, an electric ignition for said burner, parallel electric circuits for said pumping means and said ignition, an electrically operated valve controlling the flow of fuel to said burner, a circuit for said fuel valve, a first switch means comprising two switches one of which is in a circuit portion common to said pumping means and said ignition circuits and the other in said fuel valve circuit, said switches being arranged for sequential operation to energize said pumping means and ignition prior to said fuel valve and having an initial open position, a switch operating lever spring loaded toward a switch open position, said lever having a down-turned bearing portion, a pivoted operating member having a cam surface engageable with said lever bearing portion and operable upon initial movement thereunder to pivot said lever to close said switches and upon continued movement to reopen said switches, a spring holding said operating member in an initial position permitting said lever to assume a switch open position, an electric motor operable as a timing means for moving said operating member, a circuit for said motor, gear means for transmitting movement from said motor to said operating member and having portions one of which is movable into and out of engagement with the other, a lever having a magnetic armature portion and operable upon movement to move said one gear portion into engagement with the other, said gear engaging lever being spring loaded toward a gear disengaged position, an electromagnet operable upon energization to attract said armature portion for engaging said gear portions, a circuit for said electromagnet, a circuit portion common to said motor and said electromagnet circuits, a room thermostat in said last-named circuit portion; relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact and spring biased for a normal initial engagement with one of the other contacts of said first contact arms, said relay switch means having a coil operable upon energization to move said first contact arms and their contacts away from said fixed contacts and to move said second contact arms therewith, a circuit for said relay coil; one of said fixed contacts and the first and second contact arms cooperable therewith defining a first switch portion in said ignition circuit, said last-named contact arms and their contacts defining a second switch portion in said pumping means circuit, the other of said fixed contacts and the first and second contact arms cooperable therewith defining a third switch portion in said motor circuit, said last-named contact arms and their contacts defining a fourth switch portion in said relay coil circuit, a photo-electric cell and circuit therefor responsive to the occurrence of flame in said burner and operable to energize said relay coil and move said first and said second contact arms away from said fixed contacts to open said motor and said ignition circuits, a mechanical latch cooperable with said second contact arms when in an actuated position and operable to restrain the return movement of the same so that upon deenergization of said relay coil said first contact arms may move away from said second contact arms to open said pumping means, motor, ignition and relay coil circuits, said first switch lever being engageable with said latch and operable upon opening movement thereof to release said latch to permit said second contact arms to move and make contact with said first contact arms, a switch in circuit with said relay coil and including a means responsive to the flow of fuel to said burner and operable to close upon initiation of flow and open immediately after the emergence of fuel at the burner, the opening and closing of said last-named switch being operable to energize and subsequently deenergize said relay coil so that said second contact arms will be latched and said first contact arms moved away therefrom and all of the control circuits therethrough deenergized in the event that the relay coil is not energized by said photo-electric cell prior to its deenergization by the opening of said flow responsive switch, said flow responsive switch and said photo electric cell thus providing for the deenergization of said fuel supply means and said ignition in the event that flame does not occur in said burner substantially simultaneously with the emergence of fuel thereinto, said motor being operable in the event of failure of said relay switch means to open to continue to move said operating member until said lever bearing portion slips over one edge of said operating member, and said last-named movement of said switch lever being operable to open said first switch means and to position said bearing portion as at catch to prevent the return of said operating member upon subsequent deenergization of said gear engaging electromagnet by opening said room thermostat.

23. In a control device, a control circuit, a first switch means controlling energization of said circuit, operating means biased in one direction to an initial inoperative position and operable upon movement in the other direction to close and subsequently to reopen said switch means, electrically operated timing means operable to move said operating means in said other direction, releasable means having an actuated position operable to transmit movement from said timing means to said operating means, said releasable means being operable upon release from said actuated position to permit said operating means to return to said initial position to open said first switch means, a circuit for said timing means adapted for control by a switch external to said control device, a second switch means controlling said control circuit and said timing means circuit; and said second switch means being operable upon actuation within a predetermined time to deenergize said control circuit and said timinig means circuit to prevent the reopening of said first switch means by said timing means.

24. A control device for a burner control system having a burner, electrically operated means for supplying fuel to the burner, an electric ignition, and a switch operated in response to flame in the burner; comprising control circuits for said fuel supply means and said ignition means, a first switch means adapted to control energization of said fuel supply means and said ignition means circuits, an operating member biased in one direction to an initial inoperative position and operable upon movement in the other direction to close and subsequently to reopen said switch means, an electric motor operable as a timing means for moving said operating member in said other direction and having an electric circuit adapted for control by a switch external to said control device, electrically operated releasable means having an actuated position operable to transmit movement from said motor to said operating member, said releasable means being operable upon release from said actuated position to permit said operating member to return to said initial position to open said first switch means, a second switch means electrically operated and controlling the energization of said ignition and said motor circuits, a circuit controlling the energization of said second switch means and controlled by said flame responsive switch, and said second switch means being operable upon actuation within a predetermined time after the closing of said first switch means to deenergize said ignition and said motor circuits, the deenergization of said motor preventing the reopening of said first switch means by said operating member.

25. In a control device, a control circuit, a first switch means controlling energization of said circuit, an operating member for actuating said switch means, said operating member being biased in one direction to an initial inoperative position and operable upon movement in the other direction to close and subsequently to reopen said switch means, an electric motor operable as a timing means for moving said operating member, gear means for transmitting movement from said motor to said operating member and having an initial inoperative position, electrically operated means operable upon energization to effect an operative motion transmitting engagement of said gear means and upon deenergization to release said operating member for return to said initial position, circuits for said motor and said gear engaging means adapted for control by a switch external to said control device, a second switch means controlling the energization of said control circuit and said motor circuit and operable upon actuation to open them, and said second switch means being operable upon actuation within a predetermined time to deenergize said motor to prevent the reopening of said first switch means by said operating member.

26. In a control device, a control circuit, a first switch means controlling energization of said circuit, an operating member for actuating said switch means, said operating member being biased in one direction to an initial inoperative position and operable upon movement in the other direction to close and subsequently to reopen said switch means, an electric motor operable as a timing means for moving said operating member, gear means for transmitting movement from said motor to said operating member and having two portions one of which is movable into and out of engagement with the other and which has an initial disengaged position, an electromagnet operable upon energization to move said one gear means portion into engagement with the other and upon deenergization to release the same to permit said operating member to return to said initial position, circuits for said motor and said electromagnet adapted for control by a switch external to said control device, a second switch means controlling the energization of said control circuit and said motor circuit and operable upon actuation to open them, and said second switch means being operable upon actuation within a predetermined time to deenergize said motor to prevent the reopening of said first switch means by said operating member.

27. In a control device, a control circuit, a first switch means controlling energization of said circuit, an operating member for actuating said switch means and operable upon movement in one direction to close and subsequently to reopen the same, an electric motor operable as a timing means for moving said operating member in said one direction, said operating member being pivotally supported for movement and having a gear sector portion at one end and biased in the opposite direction to an initial inoperative position, said motor having a drive shaft with a gear thereon, a pivoted gear engaging member pivoted on said motor shaft and having at least one gear thereon engaged with said motor shaft gear, said gear engaging member being pivotally movable to move its gear into and out of engagement with said sector gear and having an initial position out of engagement therewith, a lever member operatively connected to said gear engaging member for moving the same and having a magnetic armature portion, an electromagnet cooperable with said armature portion for moving said lever and said gear engaging member, circuits for said motor and said electromagnet adapted for control by a switch external to said control device, said electromagnet being operable upon energization to actuate said gear engaging member to effect the transmission of movement to said operating member and upon deenergization to release the same to permit said operating member to pivot in said opposite direction to said initial position a second switch means controlling the energization of said control circuit and said motor circuit and operable upon actuation to open them, and said second switch means being operable upon actuation within a predetermined time to deenergize said motor to prevent the reopening of said first switch means by said operating member.

28. In a control device, a control circuit, a first switch means controlling energization of said circuit, an operating member for actuating said switch means biased in one direction to an initial inoperative position and operable upon movement in the other direction to close and subsequently to reopen said switch means, an electric motor operable as a timing means for moving said operating member, said operating member being pivotally supported for movement and having a gear sector portion at one end, said motor having a drive shaft with a gear thereon, a pivoted gear engaging member pivoted on said motor shaft and having at least one gear thereon engaged with said motor shaft gear, said gear engaging member being pivotally movable to move its gear into and out of engagement with said sector gear and having an initial position out of engagement therewith, said gear engaging member being operable upon release from an engaged position to release said operating member for return in said one direction to said initial position, a lever member operatively connected to said gear engaging member for moving the same and having a magnetic armature portion, a link member pivotally connected at its ends to said lever member and said gear engaging member, said link member and said lever member forming a bent linkage, said lever member being operable upon movement to move said link member therewith to straighten said linkage and thereby to move said gear engaging member for engagement of said gears, said linkage when straightened being operable to lock said gear engaging member against the reactive force exerted by said motor and said gears, an electromagnet cooperable with said armature portion for moving said lever and said gear engaging member, circuits for said motor and said electromagnet adapted for control by a switch external to said control device, a second switch means controlling the energization of said control circuit and said motor circuit and operable upon actuation to open them, and said second switch means being operable upon actuation within a predetermined time to deenergize said motor to prevent the reopening of said first switch means by said operating member.

29. In a control device, a control circuit, a first switch means controlling energization of said circuit, an operating member for actuating said switch means biased in one direction to an initial inoperative position and operable upon movement in the other direction to close and subsequently to reopen said switch means, an electric motor operable as a timing means for moving said operating member, said motor having a shaft with a gear thereon; a planetary gear mechanism comprising a sun gear, a planet gear, and an internal drum gear; said motor shaft gear being the sun gear of said planetary gear mechanism, said operating mechanism being pivoted on said motor shaft and being pivotally connected to said planet gear, an electrically operated brake for said drum gear operable upon energization to stop movement thereof and thereby cause said sun gear and planet gear to pivot said operating member about said motor shaft to actuate said switch means and upon deenergization to release the same to permit said operating member to pivot in said one direction to said initial position, circuits for said motor and said brake adapted for control by a switch external to said control device, a second switch means controlling the energization of said control circuit and said motor circuit and operable upon actuation to open them, and said second switch means being operable upon actuation within a predetermined time to deenergize said motor to prevent the reopening of said first switch means by said operating member.

30. In a control device, a control circuit, a first switch means controlling energization of said circuit, an operating member for actuating said switch means biased in one direction to an initial inoperative position and operable upon movement in the other direction to close and subsequently to reopen said switch means, an electric motor operable as a timing means for moving said operating member, said motor having a shaft with a pinion gear thereon, a rack member pivotally connected to said operating member for moving the same, said rack being movable into and out of engagement with said pinion and being initially out of engagement therewith; a member pivotally connected to said rack and having longitudinal slots therein and securing pins extending therethrough, said slots permitting longitudinal movement of said member for moving said rack, one of said slots having a lateral slot extending from one end thereof so that said member may be pivoted to position one of the securing pins therein upon engagement of said rack with said pinion and thereby providing a mechanical locking means to resist the reactive thrust of said pinion against said rack, a laterally extending arm on said member, a spring connected to said arm and urging said member toward a rack engaged position, a link pivotally connected to said lateral arm, a lever member engaging the free end of said link and supporting the same, said lever member being operable upon rack engaging movement to have lost motion relative to said link in the event that something prevents a full and complete movement of said link, a spring connected to said lever member and urging said lever member in a rack disengaging direction, said last-named spring being slightly stronger than said first-named spring, a magnetic armature portion on said lever member, an electromagnet cooperable with said armature portion and operable upon energization to move said lever and thus permit said first-named spring to move said rack into engagement with said pinion and upon deenergization to release said operating member for return to said initial position, circuits for said motor and said electromagnet adapted for control by a switch external to said control device, a second switch means controlling the energization of said control circuit and said motor circuit and operable upon actuation to open them, and said second switch means being operable upon actuation within a predetermined time to deenergize said motor to prevent the reopening of said first switch means by said operating member.

31. A control device for a burner control system having an electrically operated fuel supply means, an electric ignition, a room thermostat, and a switch operated in response to flame in the burner; comprising control circuits for said fuel supply means and said ignition, a first switch means controlling the energization of said circuits, an operating member for moving said switch means and operable upon movement to close and subsequently to reopen the same, an electric motor operable as a timing means for moving said operating member, gear means for transmitting movement from said motor to said operating member and having an initial inoperative position, electrically operated means for effecting an operative engagement of said gear means for transmitting movement to said operating member, circuits for said motor and said gear engaging means and adapted to be controlled by said room thermostat, means biasing said operating member for return to its initial position upon deenergization of said gear engaging means, a second switch means electrically operated and controlling said motor and said ignition circuits, a circuit controlling the opera-tion of said second switch means and adapted to be controlled by said flame operated switch, said second switch means being operable upon opening within a predetermined time after the closing of said first switch means to deenergize said ignition and said motor circuits and thereby prevent the reopening of said first switch means by continued movement of said operating member, and means cooperable with said operating member in the event of the reopening of said first switch means thereby to prevent the return of said operating member to its initial position upon deenergization and release of said gear engaging means.

32. In a burner control device, a control circuit, a first switch means controlling said circuits and including a contact making lever, said lever having a downturned bearing portion, a pivoted operating member operable to engage and move under said bearing portion to pivot said lever, said operating member being operable upon initial movement to move said lever to close said switch means and upon continued movement to reopen said switch means, an electric motor operable as a timing means for moving said operating member, gear means for transmitting movement from said motor to said operating member, said gear means comprising two portions one of which is movable into and out of engagement with the other and having an initial disengaged position, a lever member having a magnetic armature portion and operable upon movement to cause said gear portions to engage, an electromagnet operable upon energization to move said lever member, circuits for said motor and said electromagnet, said electromagnet circuit being adapted to be controlled by a control switch external of said control device, a spring connected to said operating member for returning the same to its initial starting position upon deenergization of said electromagnet, a second switch means electrically operated and controlling said control circuit and said motor circuit and operable upon opening movement to deenergize the same, a control circuit for said second switch means adapted to be controlled by a flame responsive means external of said control device, said motor being operable to continue to move said operating member in the event that said second switch means is not opened and after a predetermined time to a point at which said lever bearing portion drops over one edge of said operating member and opens said first switch means, a stop member preventing further movement of said operating member after said predetermined time and operable to stall said motor, and said last-named movement of said switch operating lever being operable to position said bearing projection as a catch to prevent the return of said operating member by said spring upon subsequent deenergization of said gear engaging electromagnet by opening said external control switch.

33. In a burner control device, first, second and third control circuits adapted to control first, second and third electrically operated means, a first switch means including two switches operated sequentially and operable upon closing of the first of them to energize said first and second circuits and upon closing of the second to energize said third circuit, operating means biased in one direction to an initial inoperative position and operable upon movement in the other direction to close said switch means and upon continued operation to reopen the same, electrically operated timing means operable to move said operating means in said other direction to actuate said first switch means, electrically operated releasable means having an actuated position operable to transmit movement from said timing means to said operating means, said releasable means being operable upon release from said actuated position to permit said operating means to return to said initial position to open said first switch means, a circuit for said timing means adapted for control by a switch external to said control device, a second switch means controlling said first circuit and said timing means circuit, and said second switch means being operable upon opening within a predetermined time to deenergize said first circuit and said timing means circuit and thereby to prevent the reopening of said first switch means by continued operation of said timing means.

34. In a control device, first, second, and third control circuits adapted to control first, second and third electrically operated means, a first switch means including two switches having initially open contacts, the first of said switches having its contacts in said first and second circuits, the second of said switches having its contacts in said third circuit, an operating member operable upon movement in one direction to actuate said switch means to effect a sequential closing of said first and second switches, said operating member being operable upon initial movement in said one direction to close said switches and upon predetermined continued movement to reopen them, an electric motor operable as a timing means for moving said operating member, said operating member being biased in the opposite direction to an initial inoperative position, gear means for transmitting movement from said motor to said operating member and having an initial inoperative position, electrically operated means operable upon energization to effect an operative motion transmitting engagement of said gear means and upon deenergization to release the same to permit said operating member to return in said opposite direction to said initial position, circuits for said motor and said gear engaging means adapted for control by a switch external to said control device, a second switch means having initially closed switch contacts in and controlling the energization of said first circuit and said motor circuit and operable upon actuation to open them, and said second switch means being operable upon actuation within a predetermined time to deenergize said motor to prevent the reopening of said first switch means by said operating member.

35. In a burner control device, first, second and third control circuits adapted to control first, second and third electrically operated means, a first switch means including two switches having initially open contacts, the first of said switches having its contacts in said first and second circuits, the second of said switches having its contacts in said third circuit, said switch means including a contact making lever operable upon pivotal movement in one direction to close said first and second switches sequentially, said lever having a downturned bearing portion, a pivoted operating member operable to engage and move under said bearing portion to pivot said lever in said one direction, said operating member being operable upon initial movement to move said lever to close said switches and upon continued movement to reopen said switch means, an electric motor operable as a timing means for moving said operating member, gear means for transmitting movement from said motor to said operating member, said gear means comprising two portions one of which is movable into and out of engagement with the other and having an initial disengaged position, a lever member having a magnetic armature portion and operable upon movement to cause said gear portions to engage, an electromagnet operable upon energization to move said lever member, circuits for said motor and said electromagnet, said electromagnet circuit being adapted to be controlled by a control switch external of said control device, a spring connected by said operating member for returning the same to its initial starting position upon deenergization of said electromagnet, a second switch means electrically operated and having initially closed switch contacts in and controlling said first control circuit and said motor circuit and operable upon opening movement to deenergize the same, a control circuit for said second switch means adapted to be controlled by a flame responsive means external to said control device, said motor being operable to continue to move said operating member in the event that said second switch means is not opened and after a predetermined time to a point at which said lever bearing portion drops over one edge of said operating member and pivots in the opposite direction to open said first switch means, a stop member preventing further movement of said operating member after said predetermined time and operable to stall said motor, and said last-named movement of said switch operating lever being operable to position said bearing projection as a catch to prevent the return of said operating member by said spring upon subsequent deenergization of said gear engaging electromagnet by said external control switch.

36. In a burner control device, first and second control circuits adapted to control first and second electrically operated means, a first switch means controlling said circuits, electrically operated timing means operable upon initial movement to close and upon subsequent movement to reopen said switch means, a circuit for said timing means, adapted for control by a switch external to said control device, relay switch means having a coil and comprising first and second switch portions each initially closed, a circuit for said relay coil adapted to be controlled by a flame responsive means external to said control device, said first relay switch portion controlling said first circuit and said timing means circuit, said second relay switch portion controlling all of said circuits, said relay coil being operable upon energization to open said first relay switch portion, said first relay switch portion being operable upon being opened within a predetermined time after the closing of said first switch means to deenergize said timing means circuit and to prevent the reopening of first switch means by continued operation of said timing means, and means cooperable with said second relay switch portion and operable to cause the same to be opened upon deenergization of said relay coil.

37. In a burner control device, first and second control circuits adapted to control first and second electrically operated means, a first switch means controlling said circuits, electrically operated timing means operable upon initial movement to close and upon subsequent movement to reopen said switch means, a circuit for said timing means adapted for control by a switch external to said control device, relay switch means having a coil and comprising first and second switch portions each initially closed, a circuit for said relay coil adapted to be controlled by a flame responsive means external to said control device, said first relay switch portion controlling said first circuit and said timing means circuit, said second relay switch portion controlling all of said circuits, said relay coil being operable upon energization to open said first relay switch portion, said first relay switch portion being operable upon being opened within a predetermined time after the closing of said first switch means to deenergize said timing means circuit and to prevent the reopening of first switch means by continued operation of said timing means, a mechanical catch cooperable with said second relay switch portion and operable to cause the same to be opened upon deenergization of said relay coil, and said first switch means being cooperable with said catch and operable upon opening movement thereof to release said catch to permit said second relay switch portion to close.

38. In a burner control device, first and second control circuits adapted to control first and second electrically operated means, a first switch means controlling said circuits, electrically operated timing means having a circuit adapted to be controlled by a switch external of said control device, said timing means being operable upon initial movement to close and upon subsequent movement to reopen said switch means; relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact having a normal initial engagement with one of the other contacts of said first contact arms, said relay switch means having a coil and circuit therefor operable upon energization to move said first contact arms and their contacts away from said fixed contacts and to move said second contact arms therewith, said first-named movable contacts and said fixed contacts defining first and second relay switch portions controlling the energization of said first circuit and said timing means circuit respectively, said second-named movable contacts and the other contacts of said first contact arms defining third and fourth relay switch portions, said third relay switch portion controlling the energization of said first and said second circuits said fourth relay switch portion controlling the energization of said timing means and said relay coil, said relay coil circuit being adapted to be controlled by a flame responsive means external to said control device, said relay coil being operable upon energization within a predetermined time after the closing of said first switch means to move said first and said second contact arms to open said first and said second relay switch portions to deenergize said first circuit and said timing means circuit to prevent reopening of said first switch means by continued operation of said timing means, and a mechanical catch cooperable with said second contact arms when in an actuated position and operable to restrain the return movement of the same so that upon deenergization of said relay coil said first contact arms may move away from said second contact arms to open said third and fourth relay switch portions.

39. In a burner control device, first and second control circuits adapted to control first and second electrically operated means, a first switch means controlling said circuits, electrically operated timing means having a circuit adapted to be controlled by a switch external of said control device, said timing means being operable upon initial movement to close and upon subsequent movement to reopen said switch means; relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact having a normal initial engagement with one of the other contacts of said first contact arms, said relay switch means having a coil and circuit therefor operable upon energization to move said first contact arms and their contacts away from said fixed contacts and to move said second contact arms therewith, said first-named movable contacts and said fixed contacts defining first and second relay switch portions controlling the energization of said first circuit and said timing means circuit respectively, said second-named movable contacts and the other contacts of said first contact arms defining third and fourth relay switch portions, said third relay switch portion controlling the energization of said first and said second circuits, said fourth relay switch portion controlling the energization of said timing means and said relay coil, said relay coil circuit being adapted to be controlled by a flame responsive means external to said control device, said relay coil being operable upon energization within a predetermined time after the closing of said first switch means to move said first and said second contact arms to open said first and said second relay switch portions to deenergize said first circuit and said timing means circuit to prevent reopening of said first switch means by continued operation of said timing means, a mechanical catch cooperable with said second contact arms when in an actuated position and operable to restrain the return movement of the same so that upon deenergization of said relay coil said first contact arms may move away from said second contact arms to open said third and fourth relay switch portions, and said first switch means being engageable with said catch and operable upon opening movement thereof to release said catch to permit said second contact arms to move and close said third and fourth relay switch portions.

40. In a burner control device, first and second control circuits adapted to control first and second electrically operated means, a first switch having a pair of initially open contacts in a circuit portion common to said first and second circuits, a lever carrying one of said contacts and spring loaded toward open position, said lever having a downturned bearing portion, a pivoted operating member having a cam surface engageable with and operable to move said lever bearing portion to pivot said lever for closing said switch contacts, said operating member being operable upon initial movement to pivot said lever in one direction to close said switch contacts and upon predetermined continued movement to permit said lever to pivot in the opposite direction to reopen said contacts, a spring holding said operating member in an initial position permitting said lever to assume a contact open position, an electric motor operable as a timing means for moving said operating member, gear means for transmitting movement from said motor to said operating member and having two portions one of which is movable into and out of engagement with the other, a lever having a magnetic armature portion and operable upon movement to move said one gear portion into engagement with the other, said gear engaging lever being spring loaded toward a disengaged position, an electromagnet operable upon energization to attract said armature portion and move said lever to engage said gear portions, circuits for said motor and said electromagnet, said electromagnet circuit being adapted to be controlled by a room thermostat located external of said control device; relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact and spring biased for a normal initial engagement with one of the other contacts of said first contact arms, said relay switch means having a coil operable upon energization to move said first contact arms and their contacts away from said fixed contacts and to move said second contact arms therewith, a circuit for said relay coil; one of said fixed contacts and the first and second contact arms cooperable therewith defining a first switch portion in said first circuit, said last-named contact arms and their contacts defining a second switch portion in said second circuit, the other of said fixed contacts and the first and second contact arms cooperable therewith defining a third switch portion in said motor circuit, said last-named contact arms and their contacts defining a fourth switch portion in said relay coil circuit, said relay coil being operable upon energization within a predetermined time after the closing of said first switch to move said first and second contact arms away from said fixed contacts to open said first circuit and said motor circuit and thereby to prevent the reopening of said first switch by continued movement of said operating member, a mechanical latch cooperable with said second contact arms when in the coil energized position and operable to restrain the return movement of the same so that upon deenergization of said relay coil said first contact arms may move away from said second contact arms to open said first, said second, said motor, and said relay coil circuits, said first switch lever being engageable with said latch and operable upon opening movement thereof to release said latch to permit said second contact arms to move and make contact with said first contact arms, said motor being operable in the event of failure of said relay switch means to operate to continue to move said operating member until said lever bearing portion drops over one edge of said operating member and causes the lever to pivot in the opposite direction and open said first switch, and said last-named movement of said switch lever being operable to position said lever bearing portion as a catch to prevent the return of said operating member upon subsequent deenergization of said gear engaging electromagnet by opening said room thermostat.

41. In a burner control device, first, second and third control circuits adapted to control first, second and third electrically operated means, a first switch means comprising two switches having initially open contacts, one of said switches being in a portion common to said first and second circuits, the other of said switches being in said third circuit, a lever operable to close said one switch and said other switch sequentially and spring loaded toward a switch open position, said lever having a downturned bearing portion, a pivoted operating member having a cam surface engageable with and operable to move said lever bearing portion to pivot said lever for closing said switch contacts, said operating member being operable upon initial movement to pivot said lever in one direction to close said switch contacts and upon predetermined continued movement to permit said lever to pivot in the opposite direction to reopen said contacts, a spring holding said operating member in an initial position permitting said lever to assume a contact open position, an electric motor operable as a timing means for moving said operating member, gear means for transmitting movement from said motor to said operating member and having two portions one of which is movable into and out of engagement with the other, a lever having a magnetic armature portion and operable upon movement to move said one gear portion into engagement with the other, said gear engaging lever being spring loaded toward a disengaged position, an electromagnet operable upon energization to attract said armature portion and move said lever to engage said gear portions, circuits for said motor and said electromagnet, said electromagnet circuit being adapted to be controlled by a room thermostat located external of said control device; a relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact and spring biased for a normal initial engagement with one of the other contacts of said first contact arms, said relay switch means having a coil operable upon energization to move said first contact arms and their contacts away from said fixed contacts and to move said second contact arms therewith, a circuit for said relay coil; one of said fixed contacts and the first and second contact arms cooperable therewith defining a first switch portion in said first circuit, said last-named contact arms and their contacts defining a second switch portion in said second circuit, the other of said fixed contacts and the first and second contact arms cooperable therewith defining a third switch portion in said motor circuit, said last-named contact arms and their contacts defining a fourth switch portion in said relay coil circuit, said relay coil being operable upon energization within a predetermined time after the closing of said first switch to move said first and said second contact arms away from said fixed contacts to open said first circuit and said motor circuit and thereby to prevent the reopening of said first switch by continued movement of said operating member, a mechanical latch cooperable with said second contact arms when in the coil energized position and operable to restrain the return movement of the same so that upon deenergization of said relay coil said first contact arms may move away from said second contact arms to open said first, said second, said motor, and said relay coil circuits, said first switch lever being engageable with said latch and operable upon opening movement thereof to release said latch to permit said second contact arms to move and make contact with said first contact arms, said motor being operable in the event of failure of said relay switch means to operate to continue to move said operating member until said lever bearing portion drops over one edge of said operating member and causes the lever to pivot in the opposite direction and open said first switch means, and said last-named movement of said switch lever being operable to position said lever bearing portion as a catch to prevent the return of said operating member upon subsequent deenergization of said gear engaging electromagnet by opening said room thermostat.

42. In a burner control device, first and second control circuits adapted to control first and second electrically operated means, a first switch having a pair of initially open contacts in a circuit portion common to said first and second circuits, a lever carrying one of said contacts and spring loaded toward open position, said lever having a downturned bearing portion, a pivoted operating member having a cam surface engageable with and operable to move said lever bearing portion to pivot said lever for closing said switch contacts, said operating member being operable upon initial movement to pivot said lever in one direction to close said switch contacts and upon predetermined continued movement to permit said lever to pivot in the opposite direction to reopen said contacts, a spring holding said operating member in an initial position permitting said lever to assume a contact open position, an electric motor operable as a timing means for moving said operating member, said motor having a shaft with a pinion gear thereon, a rack member pivotally connected to said operating member for moving the same, said rack being movable into and out of engagement with said pinion and being initially out of engagement therewith; a member pivotally connected to said rack and having longitudinal slots therein and securing pins extending therethrough, said slots permitting longitudinal movement of said member for moving said rack, one of said slots having a lateral slot extending from one end thereof so that said member may be pivoted to position one of the securing pins therein upon engagement of said rack with said pinion and thereby providing a mechanical locking means to resist the reactive thrust of said pinion against said rack, a laterally extending arm on said member, a spring connected to said arm and urging said member toward a rack engaged position, a link pivotally connected to said lateral arm, a lever member engaging the free end of said link and supporting the same, said lever member being operable upon rack engaging movement to have lost motion relative to said link in the event that something prevents a full and complete movement of said link, a spring connected to said lever member and urging said lever member in a rack disengaging direction; said last-named spring being slightly stronger than said first-named spring, a magnetic armature portion on said lever member, an electromagnet cooperable with said armature portion and operable upon energization to move said lever and thus permit said first-named spring to move said rack into engagement with said pinion, circuits for said motor and said electromagnet, said electromagnet circuit being adapted to be controlled by a room thermostat located external of said control device, relay switch means constructed in the nature of a double pole double throw switch, said relay switch means having a pair of fixed contacts, a first pair of movable contact arms each having a pair of oppositely facing contacts one of which having a normal initial engagement with one of said fixed contacts, a second pair of movable contact arms each having a contact and spring biased for a normal initial engagement with one of the other contacts of said first contact arms, said relay switch means having a coil operable upon energization to move said first contact arms and their contacts away from said fixed contacts and to move said second contact arms therewith, a circuit for said relay coil; one of said fixed contacts and the first and second contact arms cooperable therewith defining a first switch portion in said first circuit, said last-named contact arms and their contacts defining a second switch portion in said second circuit, the other of said fixed contacts and the first and second contact arms cooperable therewith defining a third switch portion in said motor circuit, said last-named contact arms and their contacts defining a fourth switch portion in said relay coil circuit, said relay coil being operable upon energization within a predetermined time after the closing of said first switch to move said first and said second contact arms away from said fixed contacts to open said first circuit and said motor circuit and thereby to prevent the reopening of said first switch by continued movement of said operating member, a mechanical latch cooperable with said second contact arms when in the coil energized position and operable to restrain the return movement of the same so that upon deenergization of said relay coil said first contact arms may move away from said second contact arms to open said first, said second, said motor, and said relay coil circuits, said first switch lever being engageable with said latch and operable upon opening movement thereof to release said latch to permit said second contact arms to move and make contact with said first contact arms, said motor being operable in the event of failure of said relay switch means to operate to continue to move said operating member until said lever bearing portion drops over one edge of said operating member and causes the lever to pivot in the opposite direction and open said first switch, said last-named movement of said switch lever being operable to position said lever bearing portion as a catch to prevent the return of said operating member upon subsequent deenergization of said gear engaging electromagnet by opening said room thermostat, a reset mechanism engageable with said switch lever and operable to pivot the same to move said bearing portion out of latching engagement with said operating member, and said reset mechanism including a mechanical linkage engageable with and operable to move said link member to disengage said rack from said pinion in the same movement with the disengagement of said lever bearing portion from said operating member.

FRED B. AUBERT.

REFERENCES CITED

The following references are of record in the file of this patent:

UNITED STATES PATENTS

| Number | Name | Date |
|---|---|---|
| 1,876,281 | Eiseman | Sept. 6, 1932 |
| 2,136,235 | Crago | Nov. 8, 1938 |
| 2,185,752 | Raney | Jan. 2, 1940 |
| 2,325,440 | Townsend | July 27, 1943 |
| 2,377,535 | Wilson | June 5, 1945 |
| 2,388,666 | Bower | Nov. 13, 1945 |